(12) United States Patent
Door et al.

(10) Patent No.: US 8,344,288 B2
(45) Date of Patent: Jan. 1, 2013

(54) HEATERS FOR AUTOMOTIVE MIRRORS AND REARVIEW ASSEMBLIES USING THE SAME

(75) Inventors: Michael J. Door, Wayland, MI (US); Craig R. Myers, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 440 days.

(21) Appl. No.: 12/686,019

(22) Filed: Jan. 12, 2010

(65) Prior Publication Data
US 2011/0168687 A1  Jul. 14, 2011

(51) Int. Cl.
*H05B 3/00* (2006.01)
(52) U.S. Cl. ........................................ 219/219; 219/202
(58) Field of Classification Search .................. 219/219
See application file for complete search history.

(56) References Cited

U.S. PATENT DOCUMENTS

| | | | |
|---|---|---|---|
| 3,686,473 A * | 8/1972 | Shirn et al. ................. | 219/219 |
| 4,931,627 A * | 6/1990 | Watts .......................... | 219/548 |
| 5,517,003 A | 5/1996 | Kadooka et al. | |
| 6,065,842 A * | 5/2000 | Fink ............................ | 359/846 |
| 6,426,485 B1 | 7/2002 | Bulgajewski et al. | |
| 7,230,207 B2 | 6/2007 | Witzke et al. | |
| 2003/0169520 A1 * | 9/2003 | Goldstein ................... | 359/845 |
| 2004/0206739 A1 * | 10/2004 | Duance ........................ | 219/219 |

* cited by examiner

*Primary Examiner* — Jerome Jackson, Jr.
(74) *Attorney, Agent, or Firm* — Yakov Sidorin, Esq.; Quarles & Brady LLP; Scott P. Ryan

(57) ABSTRACT

A vehicular rearview assembly with a heating element. The heating element is affixed behind and in thermal communication with the mirror element of the assembly. The heating element includes a plurality of heating zones that operate in alternation according to a pre-determined time-sequence. A peripheral area of the mirror element is heated up to at least as high a temperature as an inner area of the mirror element. Switching the heating zones on and off so as to have only one heating zone on at a time is determined by a controlling circuitry at least a portion of which may be separated from the assembly and disposed in a different part of the vehicle.

17 Claims, 19 Drawing Sheets

(B)

(D)

(A)

(C)

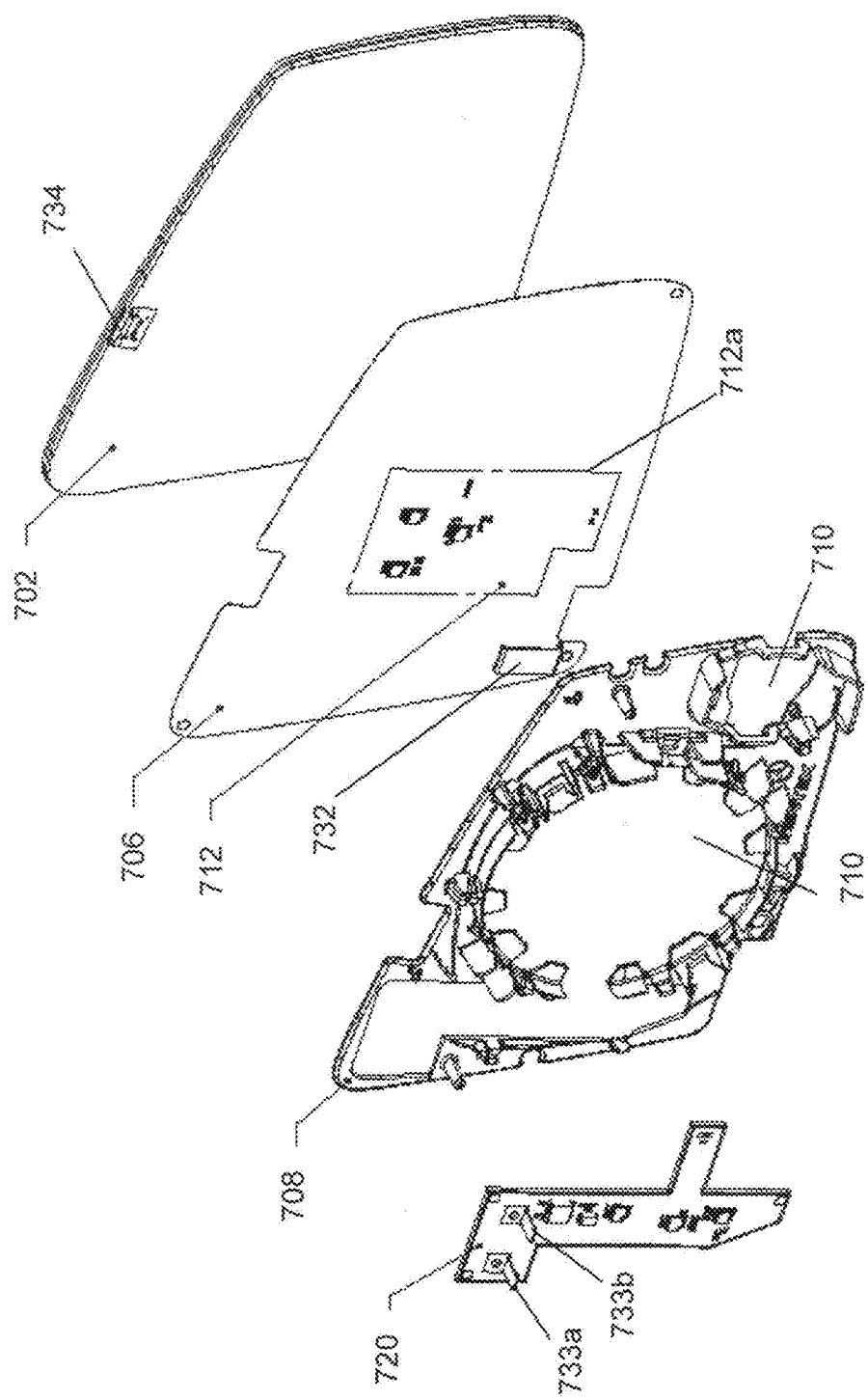

(A)

(B)

(C)

(D)

HEATERS FOR AUTOMOTIVE MIRRORS AND REARVIEW ASSEMBLIES USING THE SAME

TECHNICAL FIELD

The present invention relates to heaters for automotive mirrors and, in particular, to a self-regulating device and a method, for heating a rearview automotive mirror element, that assures maintaining a central portion of the mirror at temperatures not exceeding that of an edge portion of the mirror element.

BACKGROUND ART

An automotive reflective mirror element such as that which is part of an automotive rearview assembly often has to be heated during a cold season in order to defrost the surface of the mirror element. With most such mirror elements, an electrical heating element is arranged adjacent to a back surface of the mirror. Existing automotive mirror heating technologies relying on resistive heaters (such as constant-wattage, or CW, heaters and positive temperature coefficient, PTC, heaters) typically make use of a single heating element and one continuous heating circuit. As will be appreciated, conventional heaters used in vehicular rearview assemblies are deficient in several respects. Specifically, either of the abovementioned conventional heater tends to generate an output having a substantially uniform spatial profile that, considering asymmetry of shape and/or volume of an automotive mirror, results in a non-uniform heating profile across the mirror element. The resulting temperature gradients across the mirror produces stress in the glass of the mirror that can ultimately lead to glass fracture and mirror failure as a result of activation of a conventional defrosting heater. In addition, output power and power consumption characteristics of the CW and PTC heater designs are known to be subject to significant variations from part to part and from car to car. Prior attempts to create self-regulating automotive CW heaters have made use of mechanical thermostats, which are rather unreliable and even raise safety concerns due to overheating.

SUMMARY OF THE INVENTION

An embodiment of the present invention provides an automotive rearview assembly that includes a mirror element having a peripheral area and an inner area. The mirror element may be an electrochromic mirror element or a simple reflective element. In one embodiment, the mirror element may incorporate a reflective polarizer, which, in a specific case, may include an anisotropically polarizing birefringent plastic film or layer that reflects light of one polarization and transmits light of orthogonal polarization.

The assembly further includes a heating element affixed to and located behind the mirror element with respect to a driver/viewer. The heating element includes a plurality of heating zones. The overall shape of an area occupied by the plurality of heating zones may be substantially the same as the shape of an area of the mirror element, so that in operation substantially the entire area of the mirror element is in thermal communication with the heating element. In particular, the plurality of heating zones may be substantially co-extensive with the mirror element. In one embodiment, an edge of the mirror element may also be in substantial thermal communication with the heating element. The heating element may further include thermal sensors that are configured to measure, in real time, temperature values across the surface of the mirror element to which the heating element is affixed. The heating element may be structured in such a way as to have one heating zone to be arranged in a substantially surrounding relation relative to another heating zone. Alternatively, the heating element maybe configured so as to have one heating zone to be in a substantially inner relation relative to other heating zones.

An embodiment may further include a controlling circuit that has a processor that is electrically and operationally connected with the heating element. The processor is configured to time-sequence the operation of the embodiment in that is switches a flow of current from a vehicular power supply among the heating zones of the heating element, in pre-determined sequence of predetermined time intervals, so as to heat the peripheral area to a first temperature and the inner area to a second temperature. The first temperature is at least as high as the second temperature, and the peripheral area of a glass substrate of the mirror element is substantially devoid of tensile stress. In a specific embodiment, the first temperature is higher than the second temperature, and the peripheral area is characterized by compressive stress. This operation may be achieved by, for example, by varying the duty cycles according to which the current flow is switched between the first and second heating zones so as to deliver different heat power density to different areas of the mirror element to which corresponding heating zones are affixed. Heating zones of one embodiment may be configured to generate heat outputs of different spatial density, that is different heat outputs per unit area of a mirror element to which such embodiment is affixed. In a specific embodiment, the heating zones generate heat in alternation in that no two heating zones are "on" at the same time. In one embodiment, the first temperature is a maximum temperature to which the peripheral area can be heated up and the second temperature is a maximum temperature to which the inner area can be heated up. In a specific embodiment, the first temperature is higher than the second temperature.

In addition or alternatively, the processor may be further configured to switch current flow among the heating zones so as to cause the heating element to change a temperature of the peripheral area while maintaining a temperature of the inner area. An embodiment of a method of the invention includes measuring, with a plurality of temperature sensors, temperature values across a surface of the mirror element and varying, for example increasing, a temperature of the peripheral area to one value while maintaining a temperature of the inner area at another value. The method may further include increasing a peripheral area temperature to a first maximum value and an inner area temperature to a second maximum value. The method may further include maintaining a peripheral area temperature at a first maintenance value and an inner area temperature at a second maintenance value. In one embodiment, the first and second maintenance values may be lower than the first and second maximum values and the first maximum value may be at least as high as the second maximum value.

In one embodiment, the processor has a computer readable program code thereon, the computer readable code including program code for determining a time sequence of switching, in alternation, on and off the operation of heating zones based on the input received in real time from the temperature sensors. The time sequence may be defined so as to coordinate the switching with the cycles of an automotive engine and to assure that first and second voltages are not switched on at the same time.

Another embodiment of the invention provide provides a computer program product for use on a computer system for controlling temperature of a mirror element within an automotive rearview assembly that includes a mirror element having peripheral and inner zones and a heating element having a plurality of heating zones, the heating element being affixed to and positioned behind the mirror element with respect to the viewer. The computer program product comprises a tangible computer-usable medium having computer readable program code stored thereon, and the computer readable program includes program code for detecting temperature values in a plurality of locations across the mirror element;

program code for determining a time sequence of applying voltage to heating zones from the plurality of heating zones so as to vary temperatures of the peripheral and inner zones of the mirror element from corresponding initial temperatures to corresponding maximum temperatures; and program code maintaining temperatures of the peripheral and inner zones of the mirror element at corresponding maintenance values after the maximum temperatures have been reached.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Definitions

Figure 1A:
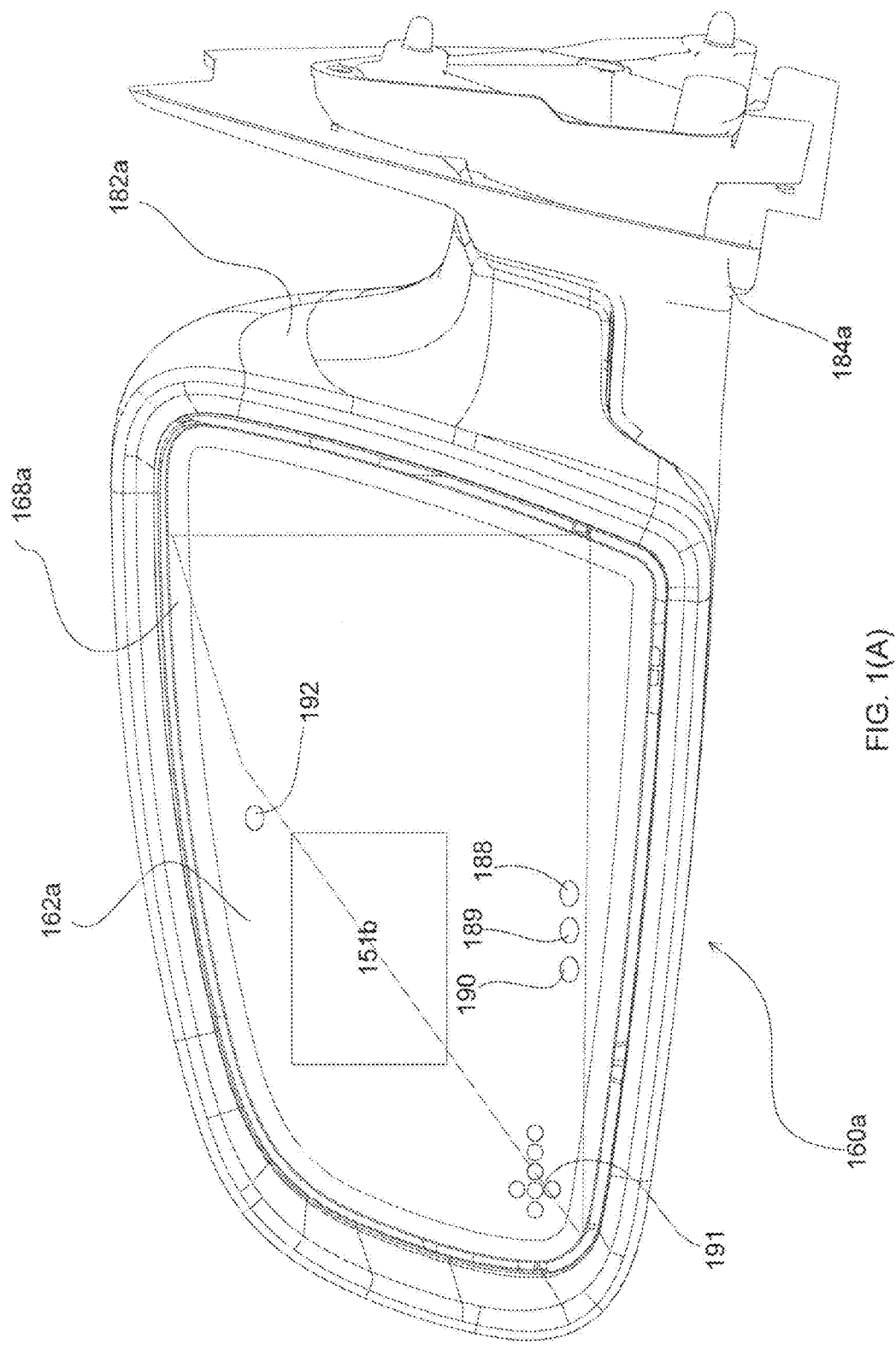
FIG. 1 depicts an embodiment of an automotive rearview assembly. (A): perspective view. (B): exploded view.

As used in this description and the accompanying claims, the following terms shall have the meanings indicated, unless the context requires otherwise:

Two or more zones, areas, or expanses are substantially coextensive on a chosen surface if projections of these zones onto such surface have substantially equal exterior bounds.

The term "image" refers to an ordered representation of detector signals corresponding to spatial positions. For example, an image may be an array of values within an electronic memory. Alternatively, a visual image may be formed on a display device such as a video screen or an information display or in reflection from a reflective surface.

Terms "defrosting," "defogging" and the like generally refer to clearing a surface of various condensed atmospheric matter. In reference to an automotive rearview assembly, for example, such clearing includes a process of elimination of condensed water or ice on the viewing surface of the assembly that impairs the quality of image formed by the assembly.

For the purposes of this disclosure and accompanying claims, a real-time performance of a system is understood as performance which is subject to operational deadlines from a given event to a system's response to that event. For example, a real-time measurement of temperature of a surface of the mirror element may be one triggered by the by the computer code and executed simultaneously with and without interruption of a mirror defrosting operation during which such data have been recorded.

Time-sequenced power management of or time-sequencing of operation of an embodiment of a heating element the invention refers to a manner of control of current flow to different heating zones of the embodiment. In particular, the time-sequencing includes a cycle of operation where the current from the electrical source (such as a vehicular battery) is supplied, in response to the real-time temperature feedback measurement of the mirror being heated and within the maximum capacity of the electrical source, to no more than one heating zone of a multi-zone heating element at a time. An embodiment of the invention subject to such time-sequence power management may be, accordingly, referred to as a time-sequenced embodiment.

The terms "heating element" and "heater" may be used interchangeably.

Embodiments of the present invention may be used with various types of automotive mirror assemblies that include, without limitation, a mirror assembly incorporating transflective elements (i.e. elements that are partially transmissive and partially reflective), a mirror assembly including prismatic reflective elements, a mirror assembly incorporating an electrochromic mirror element, and a mirror assembly incorporating a display. Transflective optics of the mirror assembly may be, without limitation, partially transmissive, directionally transmissive, multichroic, or polarization-sensitive. Various rearview and sideview mirror structures and related methods of fabrication have been addressed, for example, in U.S. Pat. Nos. 5,818,625; 6,166,848; 6,356,376; 6,700,692; 7,009,751; 7,042,616; 7,221,363; 7,372,611; 7,502,156; U.S. Patent Publications Nos. 2008/0068520, 2008/0030836, 2008/0302657, 2008/0310005, and 2007/0201122, and U.S. patent application Ser. Nos. 12/496,620 filed Jul. 1, 2009 and 12/629,757 filed Dec. 2, 2009. The rearview and sideview mirror assemblies may comprise surfaces of various geometries such as, by way of non-limiting example, planar, cylindrical, convex, aspheric, prismatic, other complex surfaces, or combinations thereof. Applications illustrating various types of automotive mirror displays are disclosed in commonly assigned U.S. Pat. Nos. 6,870,655; 6,737,630; 6,572,233; 6,552,326; 6,420,800; 6,407,468; 6,346,698; 6,170,956; 5,883,605; and 5,825,527, U.S. patent application Ser. No. 12/367,143 entitled "A Vehicular Rearview Mirror Assembly Including Integrated Backlighting for a Liquid Crystal Display (LCD)," U.S. patent application Ser. No. 12/193,426 entitled "Vehicle Rearview Assembly Including A Display for Displaying Video Captured by a Camera and User Instructions," and U.S. patent application Ser. No. 12/196,476 entitled "Discrete LED Backlight Control for a Reduced Power LCD Display System." Various types of displays incorporated within the rearview automotive mirror are known in the art such as alphanumeric displays, graphical displays, video displays such as rear camera display (RCD), and combinations thereof. These displays are discussed, for example, in U.S. Pat. No. 7,221,363, and in U.S. Patent Publication No. 2008/0068520. The disclosure of each of the abovementioned patent documents is incorporated herein by reference in its entirety, and these documents are collectively referred to herein as "Our Prior Applications."

Figure 1B:
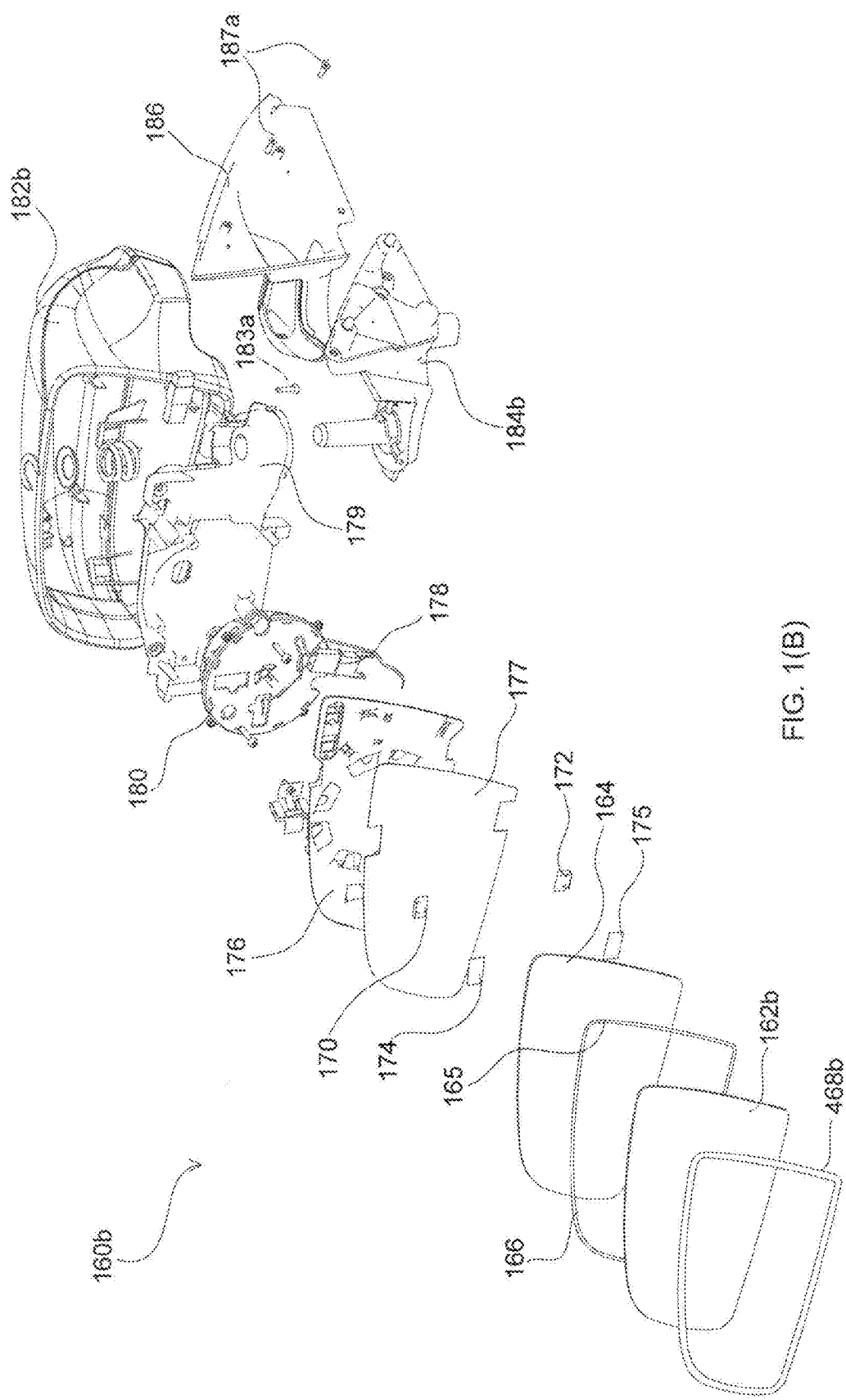

Referring now to the drawings, wherein like reference numerals indicate like parts throughout the drawings, FIGS. 1(A) and 1(B) schematically illustrate various components of an exemplary embodiment of a rearview/sideview mirror assembly 160a, 160b that contains an electro-optic element and that can be used in conjunction with an embodiment of an automotive mirror heater. An electro-optic mirror element of a mirror assembly may comprise a first substrate 162a, 162b secured in a spaced-apart relationship with a second substrate 164 via a primary seal 166 to form a chamber therebetween. At least a portion of the primary seal is left void to form at least one chamber fill port 165. An electro-optic medium is enclosed in the chamber and the fill port(s) are sealingly closed via a plug material. Preferably, the plug material is a UV curable epoxy or acrylic material. Also shown is a spectral filter material 168a, 168b located near the periphery of the element. Electrical clips 170, 172 are preferably secured to the element, respectively, via first adhesive material 174, 175. A back side of the electro-optic element is further secured to an embodiment of the heater (not shown) that, in turn, is affixed to a carrier plate 176 via second adhesive material 177. Electrical connections from the depicted embodiment of the rearview mirror to other components of the controlled vehicle are preferably made via a connector 178. The carrier plate 176 is affixed to an associated housing mount 179 via a positioner 180. Preferably, the housing mount 179 is engaged with a housing 182a, 182b and secured via at least one fastener 183a. Preferably the housing mount comprises a swivel portion configured to engage a swivel mount 184a, 184b. The swivel mount is preferably configured to engage a vehicle mount 186 via at least one fastener 187a. With further reference to FIG. 1(A), the embodiment 160a is oriented such that a view of the first substrate 162a is shown with the spectral filter material 168a positioned between the viewer and the primary seal material (not shown). Various auxiliary information devices such as, e.g., an information display 151b, a blind spot indicator 188, a keyhole illuminator 189, a puddle light 190, a turn signal 191, a photo sensor 192 may be incorporated within the rearview mirror assembly and be positioned behind the electro-optic element with respect to the viewer. Some of auxiliary devices, in particular the devices 188 through 192 are configured in combination with the mirror element to be at least partially covert as discussed in detail within various patent documents incorporated by reference herein. Additional details of all these components and devices and their interconnections and operation are provided in Our Prior Applications.

Heaters of related art, such as CW or PTC heaters, are disposed behind an automotive mirror element and defrost the mirror element starting from the center and moving outwards. When such a heater is activated to defrost an automotive mirror, it is likely to create temperature gradients both in a plane of a glass substrate of a corresponding mirror element and through the thickness of the glass, thus causing uneven strain and stress in the glass substrate of the mirror element. Tensional stress on the edge of the glass substrate is particularly critical as the edge of the glass is where most glass flaws naturally occur (due to glass processing or damage to the edge). As a result of the tensional stress, segments of the glass substrates around a pre-existing edge crack are being pulled apart and the crack propagates potentially destroying the mirror.

One of obvious causes of a temperature gradient in the plane of the mirror is an unbalanced design of a heater element. In particular, designs where a ratio of radiant surface area of the heat to its thermal mass is not accounted for or where a mechanism of attachment of the heating element to the glass operates as a heat-sink at low temperatures and as a thermal insulator as higher temperatures may prove to be detrimental to the automotive mirror. Moreover, although a conventional heater element often produces a substantially homogeneous heat output across its radiant area, the overall heating system of the mirror assembly remains unbalanced and non-uniform due to the spatially-uneven heat-sinking characteristics of the heated glass assembly. This situation may be further exacerbated by the fact that an automotive mirror is typically unevenly frozen. Some portions of the mirror housing (typically, a lower portion, when the mirror has been installed) naturally collect most of snow and ice in contact with the lower edge portion of the mirror. These edge portions of the mirror act as a "cold anchor" for the mirror system, and their temperature does not exceed 0° C. until the snow or ice is fully melted. At the same time, an area of the mirror immediately outside such a "cold anchor" area may be already fully defrosted and heated up, which may lead to significant temperature gradients across the surface of the mirror element. It is a standard practice in industry to fabricate automotive mirror heaters that heat peripheral areas of the mirror to temperatures that are lower that the temperatures of the inner areas of the mirror. Moreover, functional requirements and standards, imposed by automotive manufacturers on manufacturers of vehicular mirror assemblies, often specify that automotive mirrors be defrosted and deiced starting from the center of the mirror and moving evenly outwards. As is discussed in detail below, the idea of the present invention stems, in part, from realization that heating the edges and/or peripheral area(s) of the mirror either prior to heating the inner portion of the mirror and/or to temperatures that may exceed the temperature of inner portion of the mirror not only optimizes the mirror defrosting process, but also increases the life-time of the rearview assembly, in contradistinction with standard mirror-defrosting practice. The abovementioned industrial requirements and practices, therefore, suggest that the developments flowing from these requirements are unlikely to produce the results achieved by the present invention. These requirements and practices also indicate that industry is not aware of mechanical problems created by conventional heaters that do not operate in a manner embraced by the present invention.

Figure 2:
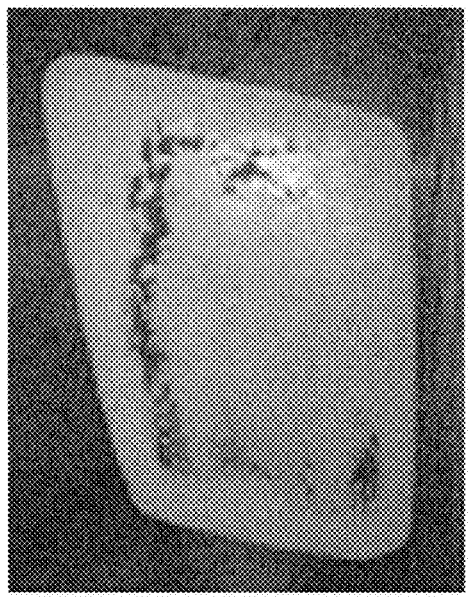
FIG. 2 shows defrosting of a viewing surface of an automotive mirror element with a conventional CW heater. (A): at 0 sec, when the heater is switched on; (B): at 120 sec; (C): at 150 sec; (D): at 240 sec.
Figure 2:
Figure 2:
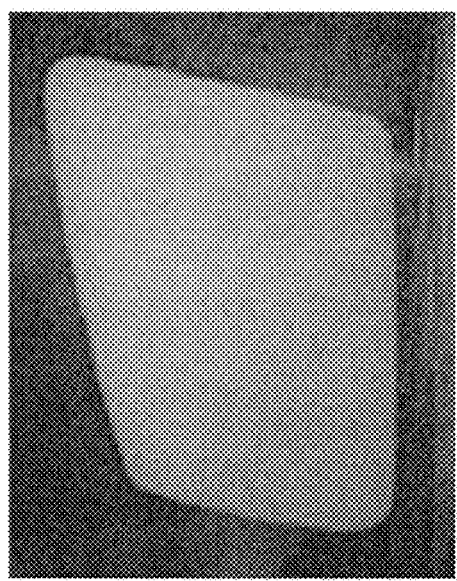
Figure 2:
Figure 3:
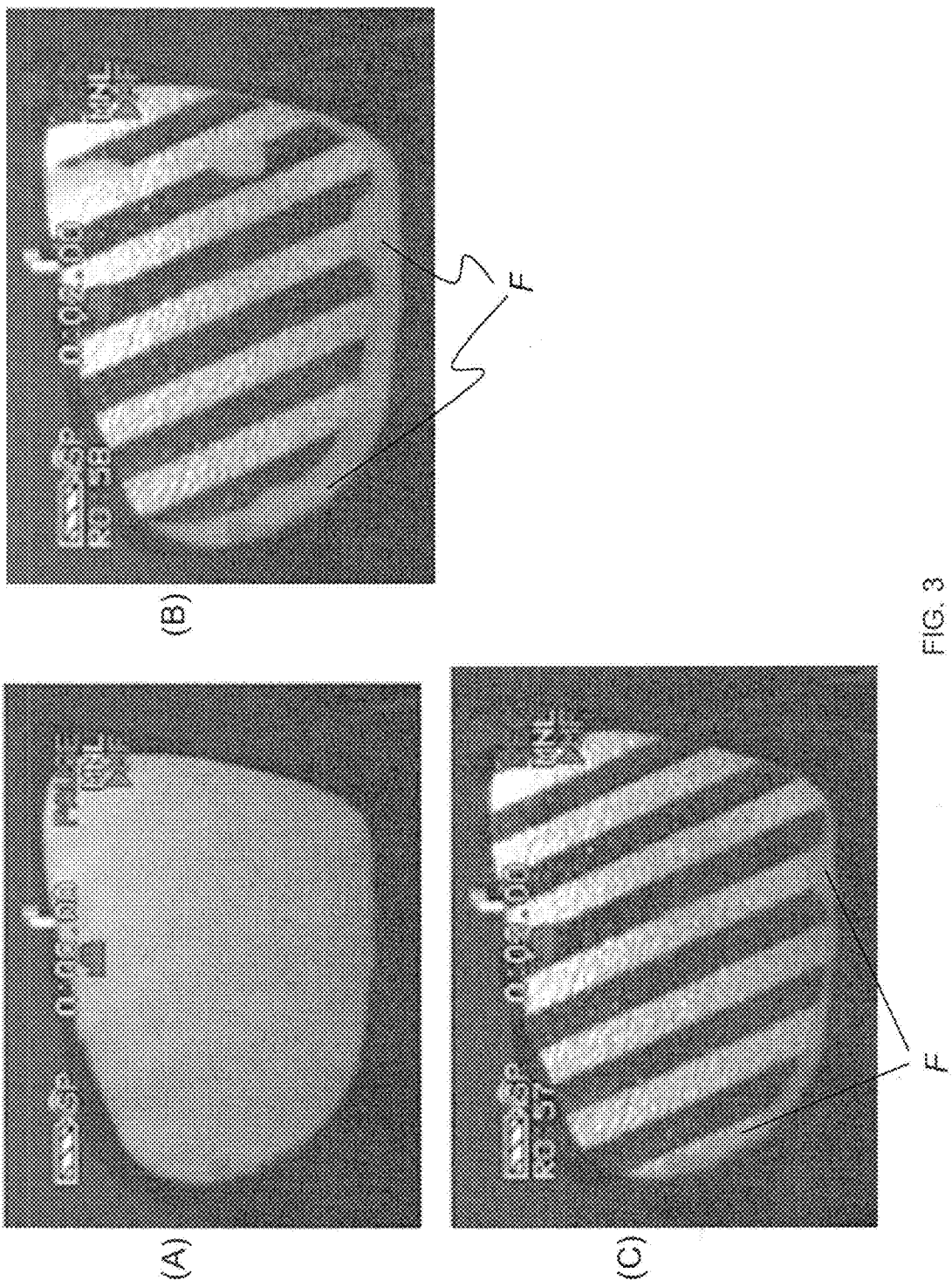
FIG. 3 shows defrosting of a viewing surface of an automotive mirror element with a conventional PCT heater. (A): at 0 sec, when the heater is switched on; (B): at 120 sec; (C): at 180 sec.
Figure 4A:
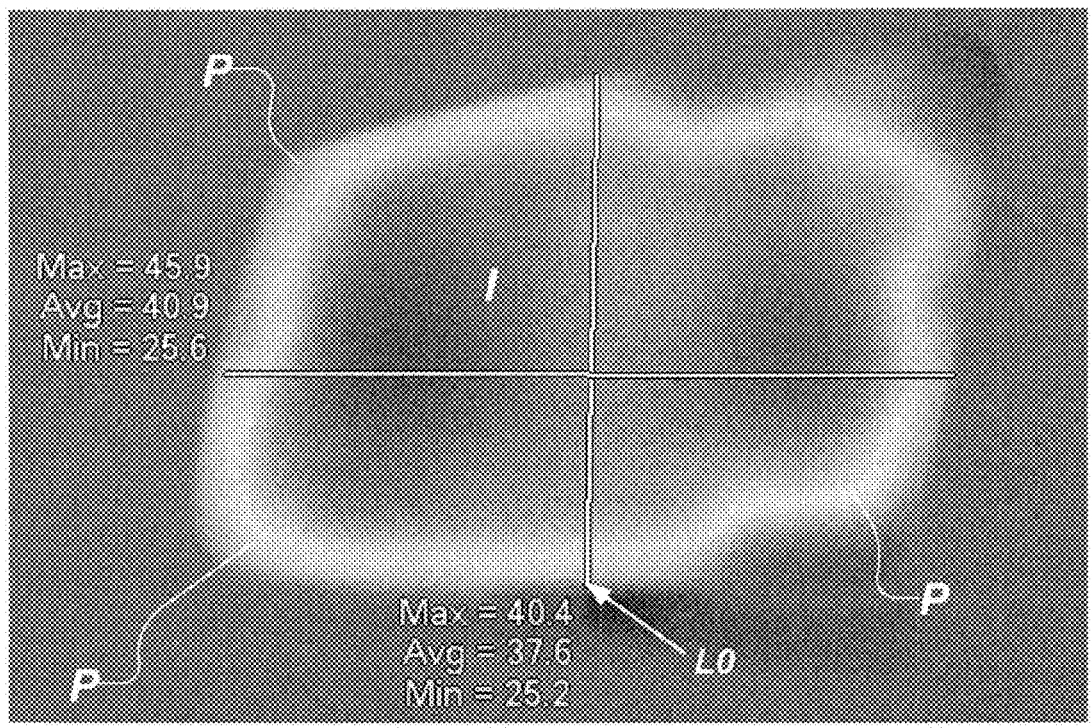
FIG. 4 illustrates operation of a related-art mirror heater. (A): an infra-red (IR) image of a mirror heated with a related-art mirror-heater; (B): a temperature profile, along a line indicated in FIG. 4(A).
Figure 4B:
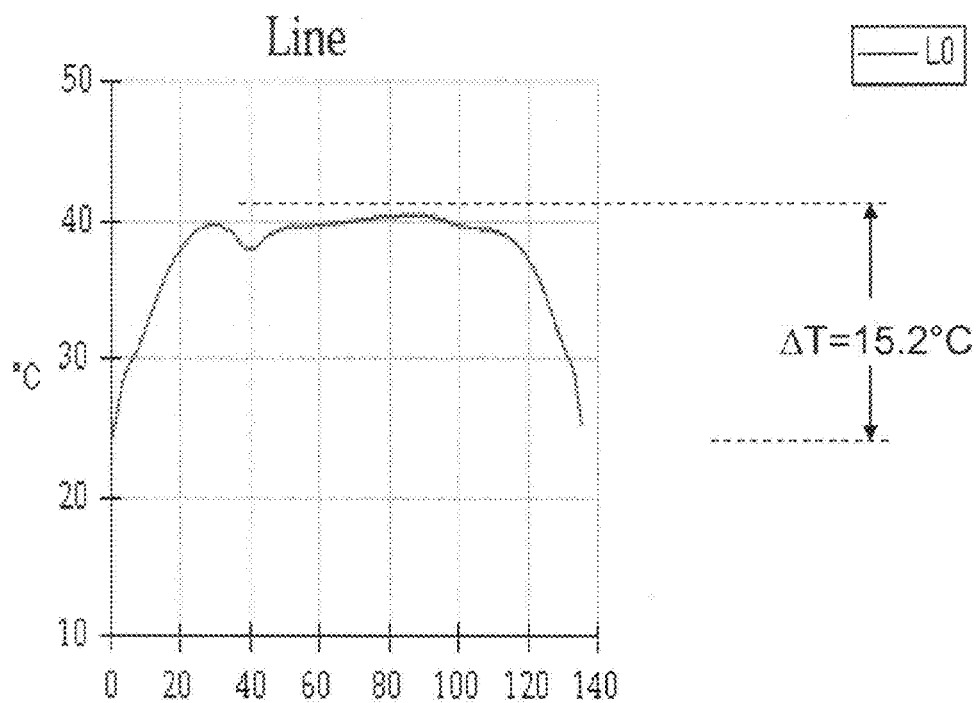

In this respect, an example of FIG. 2 illustrates an automotive mirror equipped with a conventional CW heater (not shown) that is defrosting the viewing surface of the mirror. A sequence of snap-shots of the viewing surface of the mirror is presented in FIG. 2 at different times after the CW heater has been switched on. It is readily apparent that, due to a spatially non-uniform heating profile, defrosting of the mirror surface starts in the central portion of the mirror and that the peripheral area of the mirror remains a "cold anchor" even after the inner area of the mirror has been completely cleared (see, e.g., FIG. 2(D)). Similarly, FIG. 3 demonstrates a performance of a conventional PTC-based heating device. As can be observed in FIGS. 3(B, C), the PTC-based heater offers a substantially uniform heat-output profile from the heating element, which results in an overall non-uniform temperature profile across the mirror surface. The latter leads to the lower part of a peripheral area of the mirror (area F) remaining frozen well after most of the inner portion of the viewing surface of the mirror has been defrosted. A typical non-uniform distribution of temperature profile across the surface of the mirror is shown, as infrared-image, in FIGS. 4(A, B). Here, a peripheral portion P of the mirror is seen as a bright band having a temperature of about 25 . . . 26° C., which is lower than the 40 . . . 45° C. temperature of the inner portion/of the mirror located inside the peripheral portion P. The temperature distribution in the peripheral area is observed to have a significant, in excess of 15° C., roll-off gradient at the edges of the mirror element.

Another cause of the in-plane temperature gradients produced by conventional heaters in automotive mirrors may be attributed to non-linear heat characteristics of the heaters. For example, a PTC-heater is usually characterized by not one but a dynamic range of resistance values, which results in very aggressive temperature rise times in response to supplied electrical current. Temperature gradients through the thickness of the glass substrate of the mirror, on the other hand, may be caused by the fact that the heating elements are applied only to one (typically, rear) surface of the mirror element in combination with poor thermal conductivity of the glass.

Conventional CW and PTC designs are known to have heating-power characteristics that are not necessarily reproducible from one heater to another but fall, instead, within a rather wide dynamic range. (See, e.g., www.temperatures.com/thermivendors.htnl) In the absence of external controls, the heating power produced by a heater applied to the rear surface of the mirror element is governed by the Ohm's law. The voltage source provided in the vehicle typically delivers from about 11 to about 15 Volts, and a typical resistance of a PTC or a CW heating element can also vary by a significant amount (most commonly, within a range of about 4.8 to about 6.5 Ohms or even up to 8 Ohms). Therefore, for a nominal supply voltage of 13 Volts and a 30 W heating element, the power output of a conventional heater may vary from about 18.6 W to about 46.9 W. This, in turn, requires from the system to be able to provide for a power-dissipation capability that varies by as much as from −36% to +56% as compared to the nominal value. Even if a mirror system were capable of handling such a dynamic range of heat dissipation, the temperature gradients created in an automotive mirror by such a heater would be clearly undesirable from the uniformity of operation point of view.

It is also recognized that, absent an external mechanism, such as a dedicated circuitry for controlling the heating, mirror-heating devices utilizing PTC or CW technologies waste large amounts of energy during the life cycle of the vehicle. Indeed, both the PTC and CW conventional heating system utilize only a temperature feedback as discussed, e.g., in U.S. Pat. Nos. 6,426,485 and 7,230,207. Prior art known to the inventors to date is simply not aware of the problems accompanying the conventional operation of the automotive mirror heaters. On one hand, as was discussed earlier in reference to FIGS. 2 and 3, such conventional operation leads to incomplete clearing of the viewing surface of the mirror element during the time allocated for such clearing with the peripheral portion of the mirror being still frosted or fogged. At the same time, it takes longer time to completely clear the mirror than specified by manufacturers. Specifically, while operating under the electrical power restrictions of initial current draw not exceeding 4 Amperes and a steady-state current draw not exceeding 2 Amperes (defined by the manufacturers based on the maximum capacity of the vehicular circuit), conventional heating elements are not successful in defrosting about 80% of the viewing surface area of the mirror element within 150 seconds. Moreover, the resulting overall fuel efficiency of a vehicle utilizing a conventional automotive mirror heater is lower than optimal due to the lack of coordination between the heating cycle and the engine cycle, which may become especially critical for electrical vehicles and electrical-hybrid vehicles.

The above-discussed shortcomings of the related solutions for automotive mirror heaters become particularly pronounced in mirror assemblies utilizing a plurality of glass substrates defining a thermal mass that is higher than a thermal mass of a single-substrate mirror. Embodiments of the present invention provide apparatus and methods for heating a vehicular mirror in a fashion that overcomes the weaknesses of conventional vehicular mirror heaters in an unexpected fashion. In this respect, embodiments of the present invention are configured to time-sequence and regulate, in alternation, a full-power activation of heating zones during the defrosting of an automotive mirror and/or clear a liquid condensation on a surface of the mirror and to switch, afterwards, to a different heating regime during which the heater is operated so as to merely prevent a re-formation of ice and condensation on the mirror. In addition or alternatively, embodiments of the present invention are configured to assure a spatially non-uniform heating output to heat up different segments or areas of a mirror element in a pre-determined and generally reconfigurable fashion that allows for expeditious defrosting of both the peripheral and inner areas of the mirror element within the same time interval specified by the manufacturers. At least a portion of the circuitry controlling such a heater may be spatially separated from the heating element and the mirror element and be installed in a different part of the vehicle such as the vehicle interior or a portion of a door.

Figure 5:
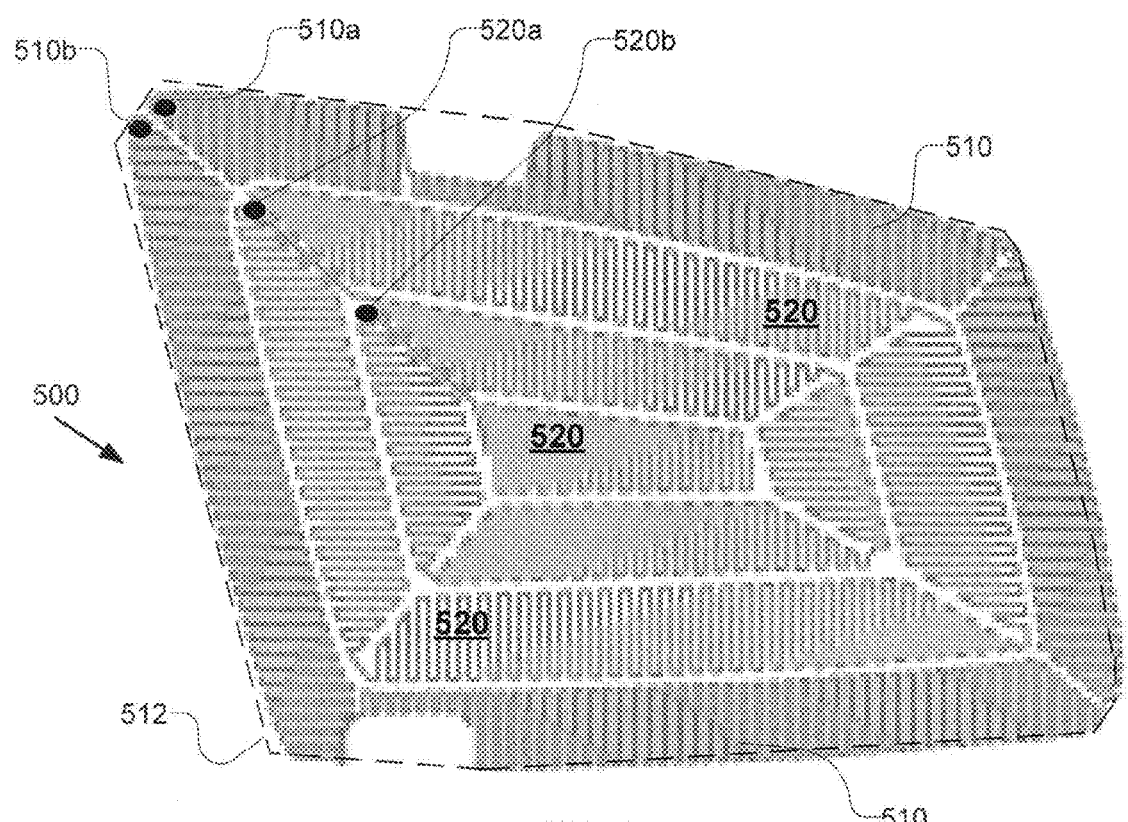
FIG. 5 shows an electrical pattern of an embodiment of a two-zone time-sequenced mirror heater of the invention.

Embodiments of a heating element of the present invention generally comprise an electronically insulated flexible substrate made of a material such as, e.g., polyimide, polyethylene terephthalate (PET), or polyester that provides a support for a plurality of operationally decoupled heating zones of the heating element. For example, as shown in FIG. 5 in top view, an embodiment 500 includes two contiguous zones, a first zone 510 corresponding to a peripheral area of a mirror element to be heated and a second zone 520, with respect to which the first zone 510 is arranged in substantially surrounding relation and which generally corresponds to an inner area of a mirror element to be heated. The heating zones 510 and 520 are not overlapping in that surface areas of the heating element 500 defined by heating zones 510 and 520 are spatially separated and not overlapping. The first and second zones 510, 520 include appropriately patterned traces or busses of electrically-conductive resistive material such as copper, aluminum, conductive ink or other material that can be advantageously used for this purpose. A flexible polymeric substrate or sheet (not shown) supports electrical patterns of the heating zones 510, 520 that are disposed on it in such a fashion as to form an overall heating zone (aggregate area of the zones 510 and 520) that is substantially co-extensive with a mirror element to be heated.

In one embodiment, the heating element may be of substantially the same shape and size as the mirror element to be heated, and a perimeter of the heating element pattern shown in a dashed line 512 may substantially coincide with a perimeter of the mirror element. Patterning of the first zone 510 is preferably accomplished so as to have the zone 510 substantially extend, in a rearview assembly, to a circumference of the peripheral zone of the mirror element. Patterning of the second zone 520 is preferably accomplished so as to have the zone 520 cover, in a rearview assembly, a majority of the inner area of the mirror element. Patterning of the heating zones may be accomplished by any method known in the art, e.g., screen printing.

In further reference to FIG. 5, each zone has a pair of terminal contacts (510a, 510b) and (520a, 520b), respectively, whereby allowing the heating zones to be connected to an external electrical power supply. When a voltage is applied across a given pair of terminals, e.g., terminals 510a and 510b and thus across the zone 510, current will flow through the pattern of a corresponding heating zone thereby heating it up. Although each of the zones 510 and 520 is shown to contain a single trace, that is only a single resistive trace is shown to connect each corresponding pair of terminals, it is understood that generally either of the heating zones may include a plurality of traces.

Figure 6C:
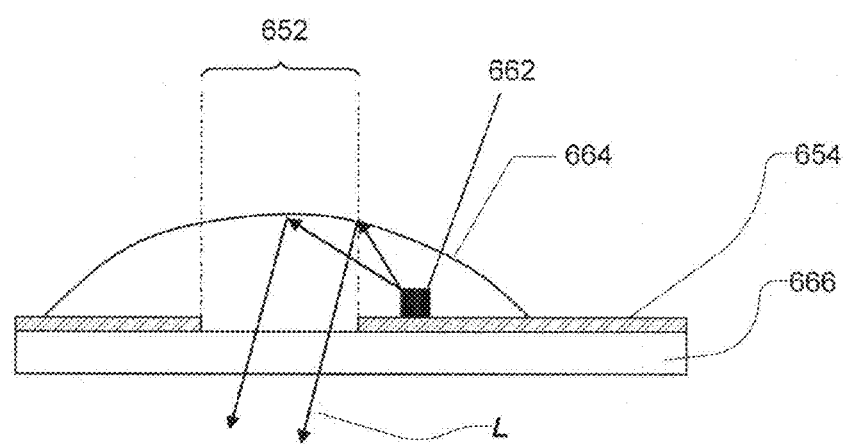
FIG. 6(C) illustrates an embodiment of the invention having light indicia opening in the heating element and an eccentric reflector.
Figure 6A:
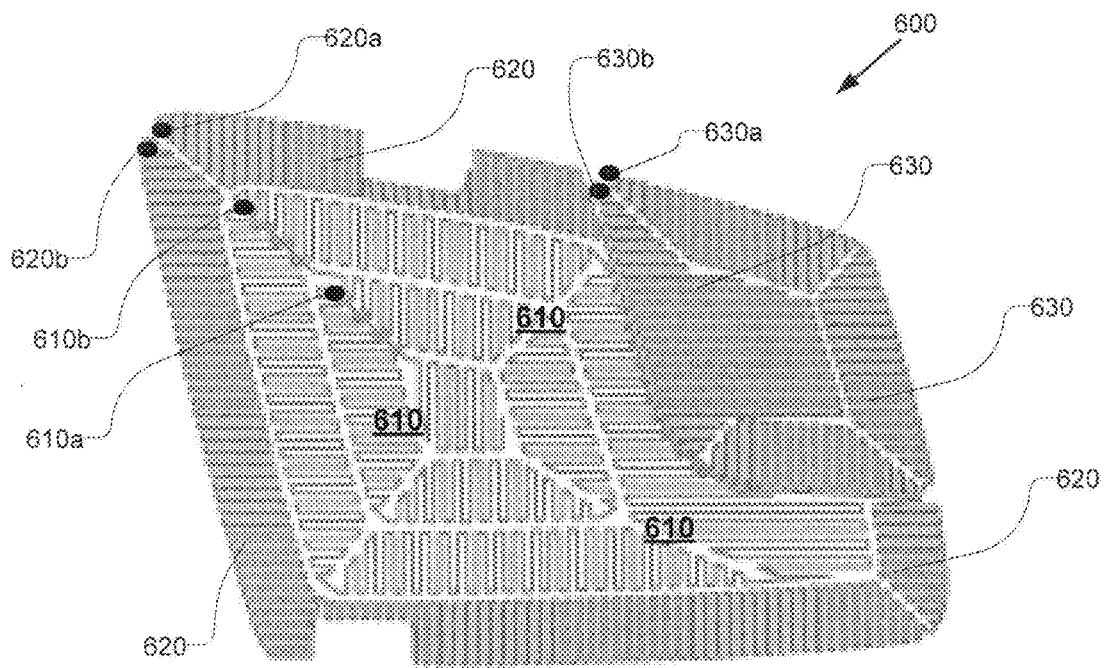
FIGS. 6 (A, B) show electrical patterns of an embodiment of a three-zone time-sequenced mirror-heater of the invention. (A): a pattern without indicia opening; (B): a pattern with indicia opening.
FIG. 6(D) shows an embodiment of the heating element.

FIG. 6(A) illustrates an embodiment 600 of a heating layer of a three-zone heating element, where a zone 610 corresponds to the inner area of the mirror element to be heated and is disposed on a substantially internal relationship with respect to a first exterior zone 620, extending along an arc of the circumference of the heating element 600, and a second exterior zone 630. Here, the zones 620 and 630 may be viewed as corresponding to different portions of the peripheral area of the mirror element to be heated. Each of the non-overlapping zones 610, 620 and 630 is configured in a general fashion described with respect to the zones of the embodiment 500 of FIG. 5, and has a pair of corresponding terminal contacts (610a, 610b), (620a, 620b), or (630a, 630b).

Figure 6B:
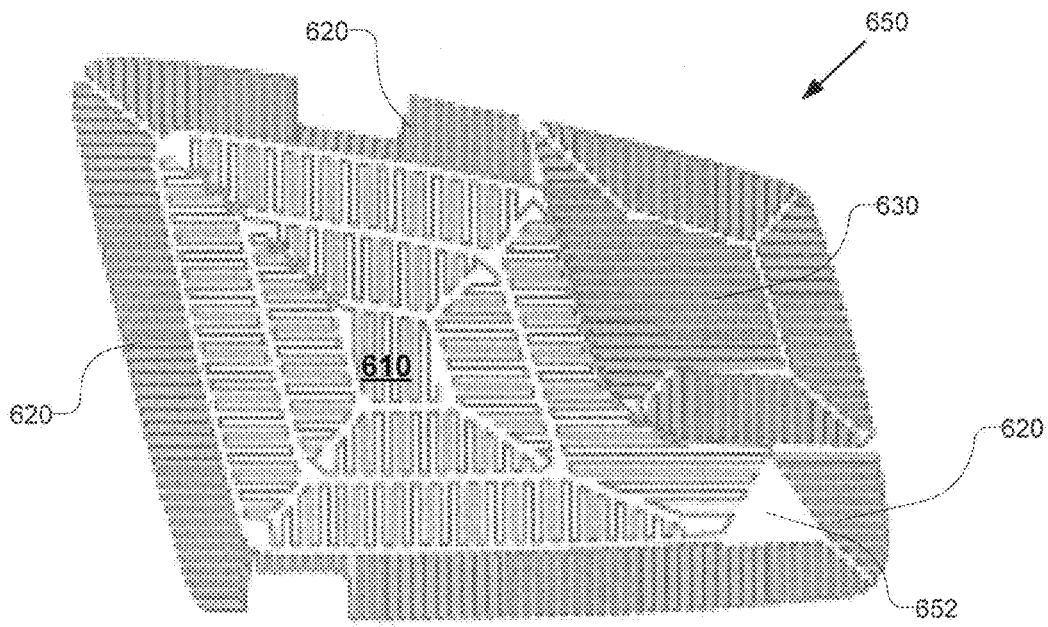

An alternative embodiment of the heating layer pattern may contain a "light indicia" opening either in a pattern of one of the heating zones or between the heating zones. As illustrated in FIG. 6(B), for example, where the terminal contacts of the heating zones are not shown for simplicity, the light indicia opening is provided between the zones 610 and 620. Such opening advantageously allows for both the heating of the mirror element and transmission of light by or to any of information or detection devices (such as, e.g., an information display 151b, a blind spot indicator 188, a keyhole illuminator 189, a puddle light 190, a turn signal 191, or a photo sensor 192 discussed above) that may be employed in a rearview assembly behind the mirror element, as defined with respect to the viewer. In a rearview assembly, the opening 652 is arranged in overlying registry with the predetermined area of the mirror element through which the light is transmitted. For example, in an automotive rearview assembly including an EC-mirror element and an information display behind the EC-element (see Our Prior Applications), the position of the light indicia opening in the heating pattern may be defined by the position of the display across the mirror. In another example, schematically illustrated in FIG. 6(C) in side view, the light indicia opening 652 in the heating element 654 of the rearview sub-assembly 660 provides an unobscured optical path for light L from LED 662 that is reflected by an eccentric or elliptical reflector 664 through a mirror element 666 towards the viewer.

Figure 6D:
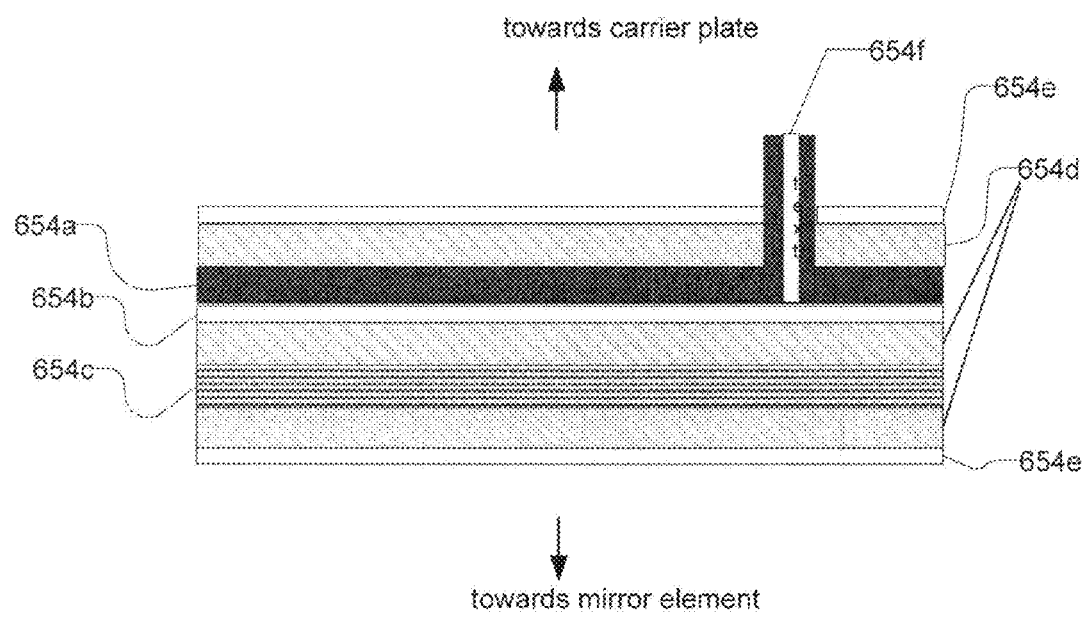

One embodiment of a heating element such as, e.g., the heating element 654 of FIG. 6(C), is schematically illustrated in FIG. 6(D), in cross-sectional view. This embodiment includes a combination, of a layer of heating traces 654a disposed on a heating support or substrate 654b. On the mirror-side, the element 654 is attached to a closed cell foam layer 654c via a layer 654d of pressure-sensitive adhesive (PSA). Further, both on the mirror-side and the carrier-plate-side, the element is sandwiched between the layers 654d of PSA and protected with peel-off liners 654e. Electrical contacts 654f (corresponding to electrical contacts provided for carious electrical traces, such as, e.g., electrical contacts 610a and 610b, 620a and 620b, 630a and 630b of FIG. 6(A)) assure electrical communication between corresponding trace layers 654a (such as trace layer 610, 620, and 630 of FIG. 6(A)) and the outside circuitry (not shown). The contacts are appropriately affixed to corresponding trace layers 654a and protrude through the PSA 654d and the liner 654e on the carrier-plate-side of the heating element. During the integration of the rearview assembly, the liners 654e are peeled off and the heating element 654 may be attached to a carrier plate and to the mirror element, while maintaining proper orientation to assure that the contact 654f is accessible through an opening in a carrier plate (not shown).

Figure 7A:
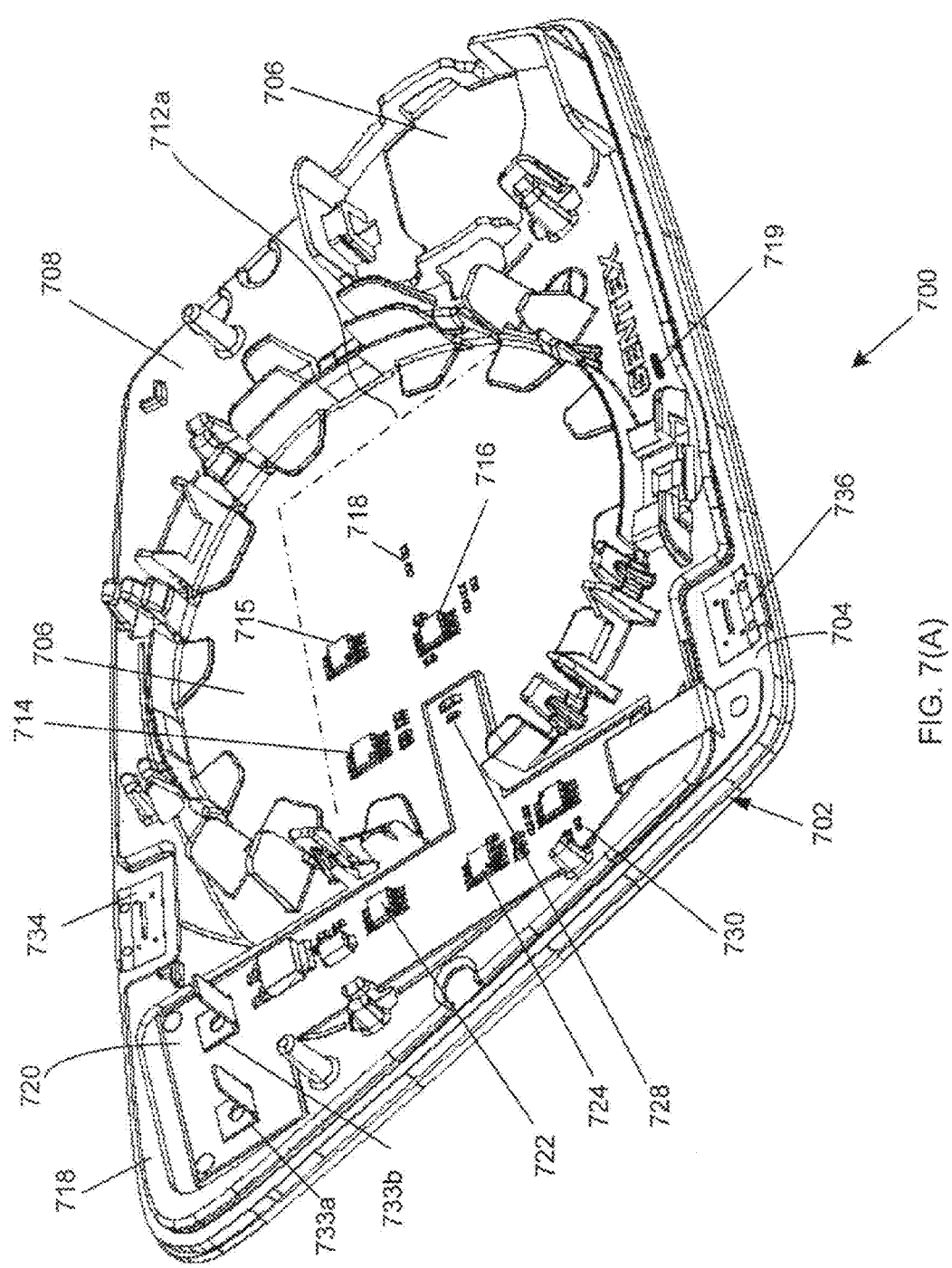
FIG. 7 shows, in perspective view, an embodiment of the rearview assembly of the invention. (A): view of assembly from the back; (B): exploded view.

In reference to FIG. 7, an embodiment of a rearview sub-assembly 700 of the invention is shown in perspective and exploded views in FIGS. 7(A) and 7(B), respectively. FIG. 7(A) shows a back side of the rearview sub-assembly. As shown in FIGS. 7(A, B), an embodiment 700 contains a mirror element 702, to a rear surface 704 of which an embodiment 706 of a flexible heater of the invention is attached using, e.g., a pressure-sensitive adhesive (PSA) film (not shown). The embodiment 706 of the heater is, in turn, attached through a layer of PSA film (not shown) to a plastic carrier plate 708, as seen through the openings 710 in the carrier plate 708. Optionally, as shown in a dot-dashed line 712a, the heater 706 may include an embedded control circuit 712 comprising at least one high-power transistor 714, a regulator 715 providing a 5 Volt supply for a microprocessor 716, and inner-region and outer-region temperature sensors 718 and 719 that in a specific embodiment may be solid-state NTC-sensors. As shown in FIG. 7(A), the sensors 719 are covered by the carrier plate 708. Alternatively, instead of the embedded control circuit 712, a non-embedded control circuit 720 may be used (e.g., as shown as a separate component) that comprises at least one high-power transistor 722, a 5 V regulator 724, a microprocessor 726, and inner-region and out-region temperature sensors 728 and 730, respectively. Each of the temperature sensors is configured to be in thermal communication with a corresponding area of the mirror element and, in operation, provide a real-time temperature measurement of temperature of the mirror element and feed these data back to the processor 726. When the non-embedded control circuit 720 is used, an embodiment may include a clamp 732 that facilitates positioning of the circuit 720 within the sub-assembly. Also shown are two electrical contacts 733s and 733b that establish electrical communication between the non-embedded circuit 720 and an outside source (such as a vehicular battery, 12 V). An embodiment of the embedded control circuit may also contain similar contacts. In an embodiment of the invention that includes an embedded controlling circuit, such controlling circuit is located in the rearview assembly. It is understood that, depending on the nature of the controlling circuit used in a specific embodiment of the invention, at least a portion of the controlling circuit may be located within the rearview assembly (embedded circuit) or externally with respect to it, for example in a door module of the vehicle (non-embedded circuit).

In FIGS. 7(A, B), an embodiment of the mirror element 702 is shown to be an electrochromic (EC) element utilizing appropriate electrically conducting clips and connectors 734, 736 that facilitate an electrical communication between an outside circuitry (not shown) and the electrode layers of the EC-element. It is understood, however, that an embodiment of the invention and a principle of its operation does not depend on or change depending on which mirror element is used, and that any mirror element appropriate for use in an automotive rearview assembly—be it a prism element, a flat element, or any other element such as, e.g., an electro-optic element—may be employed with an embodiment of the invention.

In embodiments of prior art, in order to control a distribution of heat-power output across the heating element, resistive trace patterning of the heating zones may have non-uniform surface density. For example, a portion of the heating trace may include a conductive trace that is approximately 1.5 mm wide patterned with separation gaps of about 0.675 mm. In a different portion of the heating trace or in a different heating zone, however, the conductive trace may still be approximately 1.5 mm wide but be patterned with separation gaps of about 1.15 mm. Alternatively or in addition, resistive traces of heating zones may have substantially equal separation gaps but widths that are different or that vary along the length of a particular trace. Therefore, in heating elements of prior art the ratio of heating powers at any two given locations across an embodiment of the heating element may be prearranged by varying the patterning profile of the embodiment. It was unexpectedly discovered, however, that such variation of the patterning profile, even in conjunction with multi-zone arrangement of the heating element, is not sufficient to address a problem of complete defrosting of the mirror element within the power and time limitations required by the automotive manufactures (e.g., defrosting of 80% of the mirror area in 150 seconds at ~12 . . . 13 VDC and inrush current below 4 Amperes).

Figure 8:
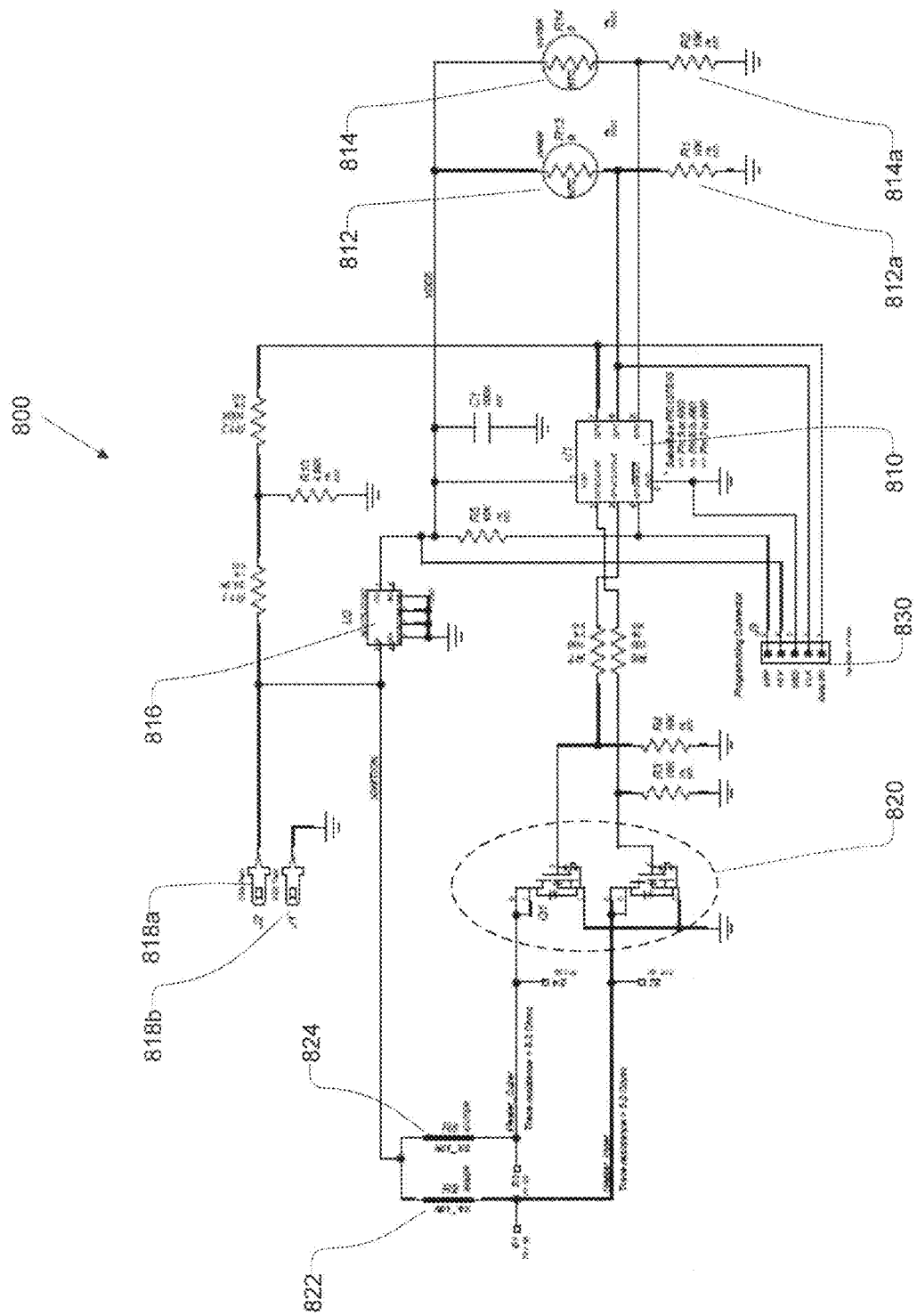
FIG. 8 shows an embodiment of the controlling circuit of the invention that provides time-sequenced power management for a multi-zone heating element of the invention.

Therefore, to facilitate an expeditious and simultaneous clearing/defrosting of both the peripheral and inner portions of the automotive rearview mirror and to increase the overall energy-efficiency of the operation of the heater, present embodiments provide for time-coordination between the cycles of the vehicular engine and the heating cycles of the heating element. In this respect, FIG. 8 illustrates an embodiment 800 of a two-zone heater control circuit (such as, e.g., the embedded circuit 700 or non-embedded circuit 720 of FIGS. 7(A, B)). Although the following is discussed with respect to the circuitry controlling the operation of a two-zone heating element of the invention, the discussed principle does not change when the circuitry is modified so as to control a heating element having three or more zones.

As shown in FIG. 8, the circuitry comprises a microprocessor 810 (corresponding to either one of the microprocessors 716 and 726 of FIG. 7), inner and outer temperature sensors 812 and 814 (respectively corresponding either to sensors 718, 719 or to sensors 728, 730 of FIG. 7) and corresponding voltage-dividing bias resistors 812a and 814a, and a 5 V regulator 816 (corresponding to either one of regulators 715 and 724 of FIG. 7). A processor 810 may be controlled by instructions stored in a tangible computer-readable memory. Further, the embodiment 800 includes electrical terminals 818a and 818b (corresponding to the contacts 733a, 733b), a high-power transistor switch 820 (comprising, in this embodiment, a pair of high-voltage transistors corresponding to either transistors 714 or transistors 722). Resistors 822 and 824 represent resistive traces of and correspond to the inner and peripheral heating zones of a two-zone heater, respectively. In operation, a voltage from a vehicular battery may be applied between the terminals 818a and 818b (the latter serving as ground).

The microprocessor 810 is pre-programmed to collect, in real time, with the use of the temperature sensors 812, 814 and voltage dividing resistors 812a and 814a and in a sequenced manner that corresponds to the time-sequenced operation of the heating zones, data that is representative of temperatures of areas of the mirror element with which such thermal sensors are in thermal communication in the rearview sub-assembly. Having compared the measured temperature values with a programmed set of temperature values (that may depend on manufacturing and/or operational requirements), the processor 810 adjusts, in a pre-programmed time-sequenced fashion, the flow of current between corresponding branches of the circuit to alternate switching "on" and "off" of high-power transistors 820 according to a prescribed duty cycle. As a result of this adjustment, the flow of current from the terminal 818a is switched, in alternating fashion, by the processor, between an electrical path that includes the thermal resistor 822 and that which includes the thermal resistor 824, in order to control heat output from the resistors 822 and 824. Put differently, at any instant of time of the operational time-sequence, a full electrical power drawn from the vehicular power supply (for example, a current flow of 4 Amperes as initial or inrush value and 2 Amperes in a steady-state, defined by the limitations of the vehicular power supply and electrical circuitry) is applied to only one thermal resistor (in this example, either 822 or 824), and no current passes through another resistor. The thermal resistor (the heating zone of the heating element) through which current flows at a given moment converts all the electrical power that the electrical source of the vehicle can provide into heating power. The embodiment further transfers this heating power to only that area of the mirror element with which this heating zone is in thermal communication, and not to the whole area of the mirror element. Therefore, time-sequenced power management of the invention achieves the goal of increasing the surface density of heat delivered to the mirror element. Another thermal resistor, through which the current does not flow, does not generate heat at that time.

Optionally, the embodiment 800 may contain a programming connector 830, which may be used for real-time programming of the microprocessor 810 (e.g., to define a new time-sequence of operation) and/or for testing of circuit 800. In such a specific case, an embodiment of the control circuit allows to reconfigure parameters of the time-sequenced power management and performance of a multi-zone heater, for example, at the stage of manufacture of the embodiment.

Figure 9A:
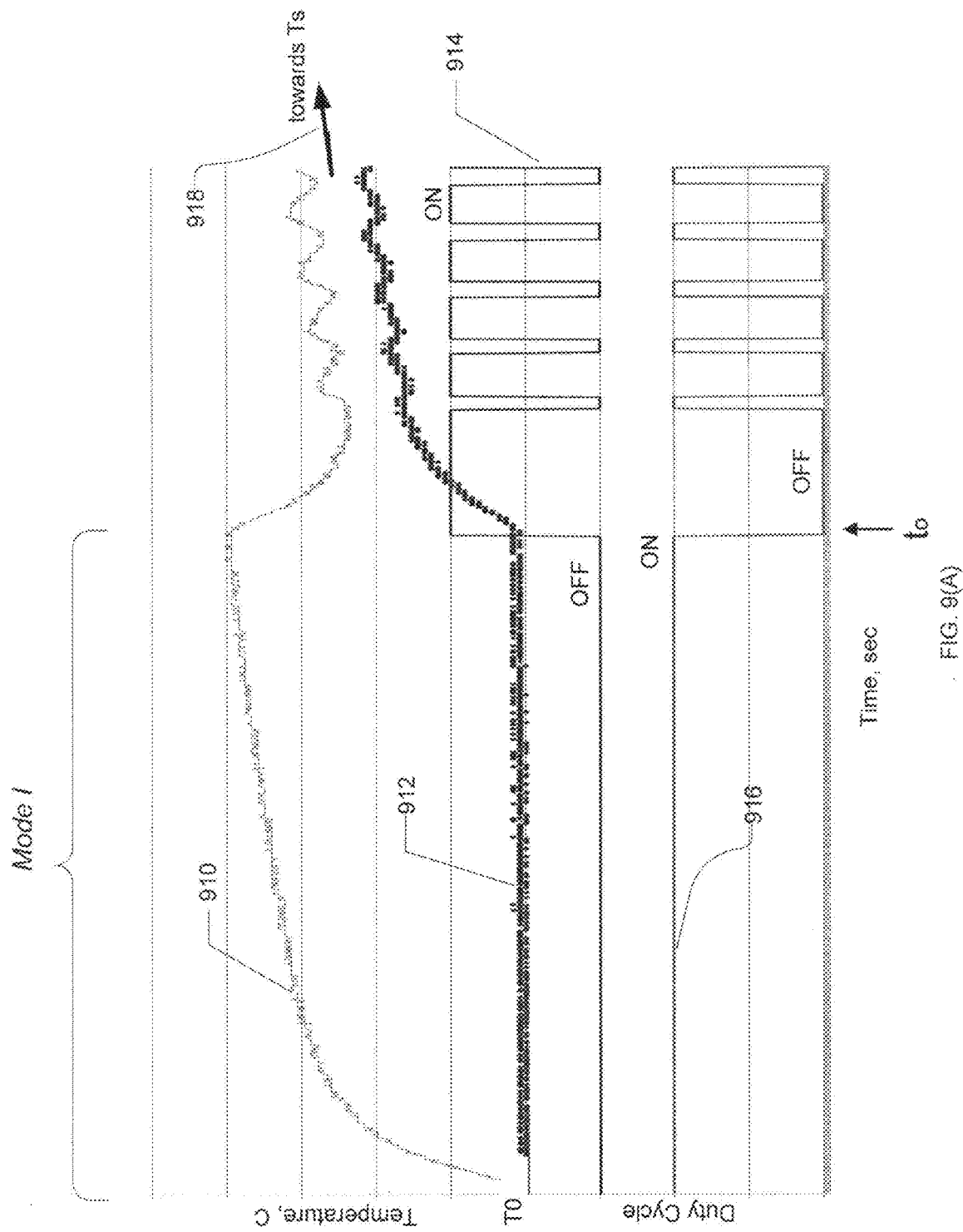
FIG. 9 demonstrates modes of operational cycle of an embodiment of the invention. (A): Mode I; (B): "ramp-up" Mode II; (C): "maintenance" Mode III.
Figure 9B:
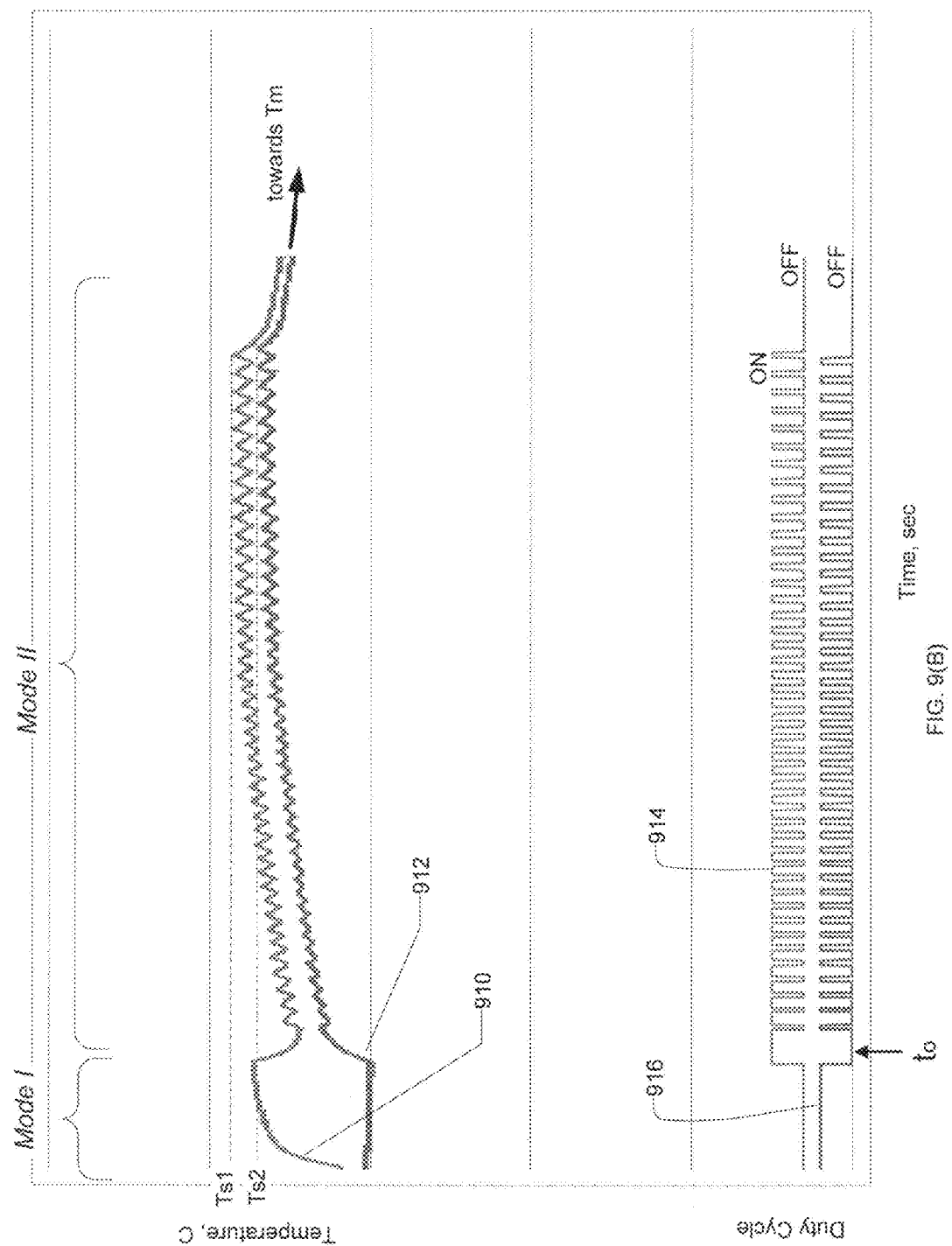
Figure 9C:
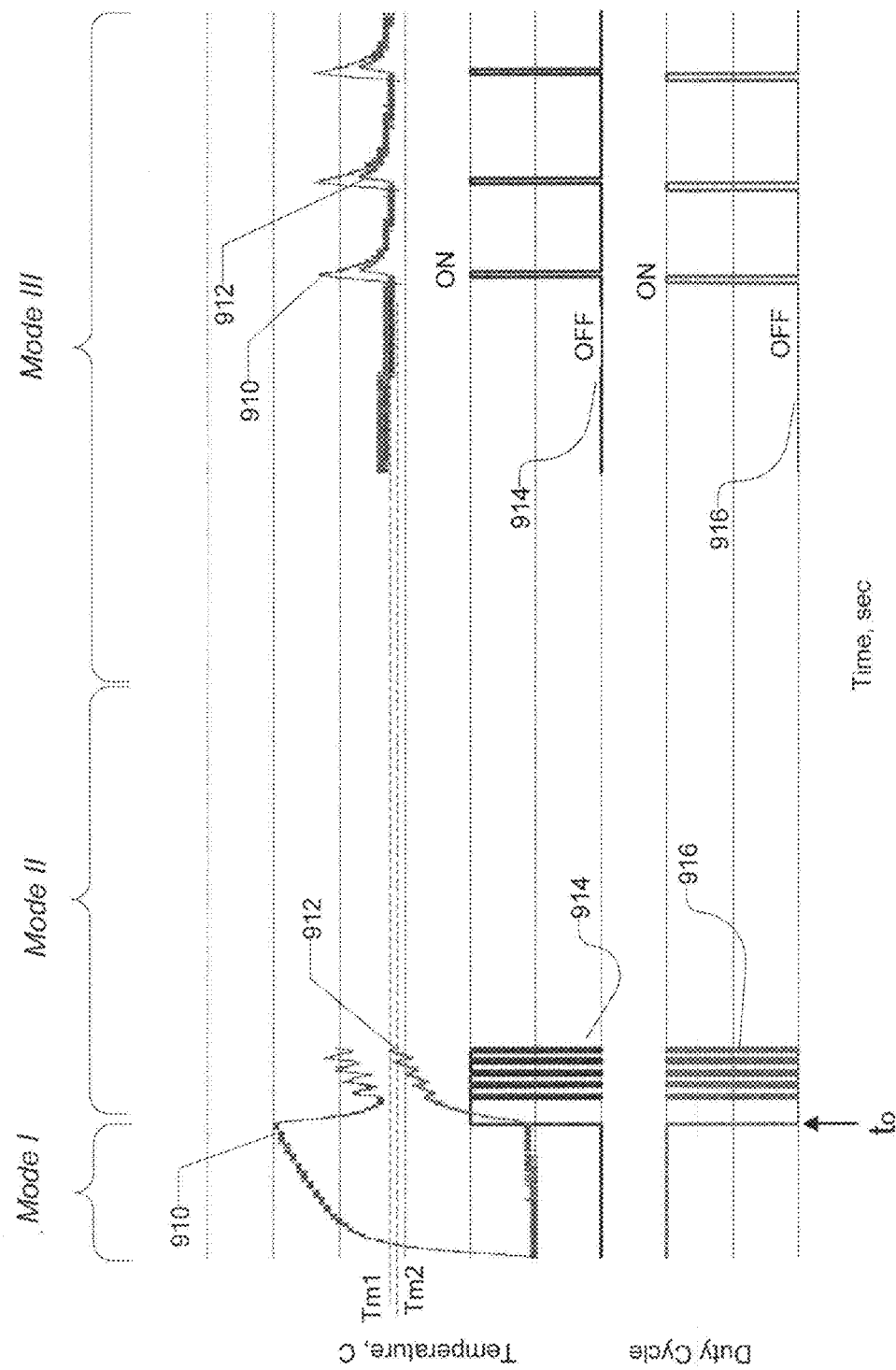
Figure 10:
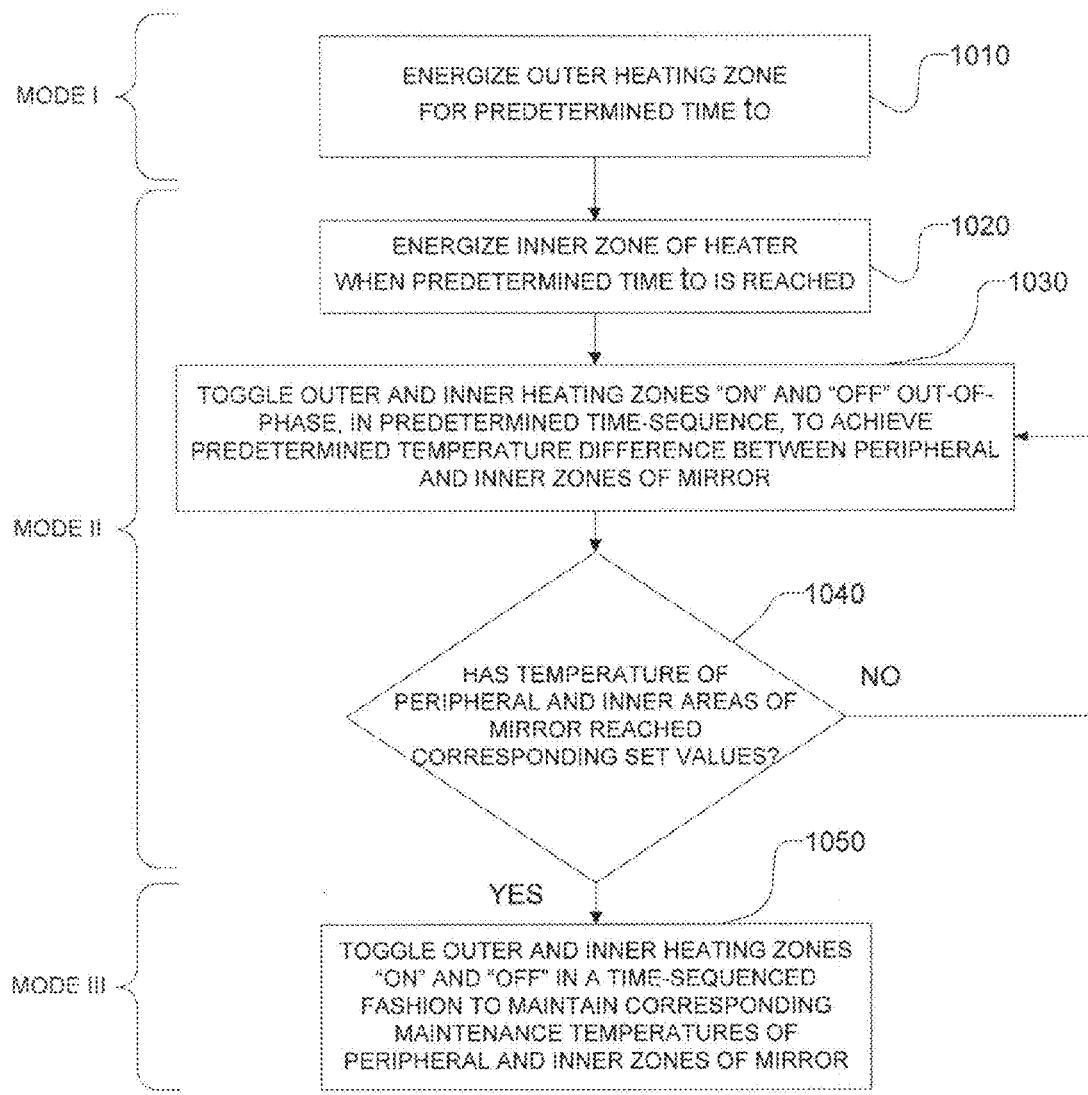
FIG. 10 illustrates an elementary flow of operation of an embodiment of a time-sequenced multi-zone heater of the invention.

Exemplary time-sequenced heating cycles are further illustrated in reference to FIGS. 8, 9(A-C), and 10. FIGS. 9(A), 9(B), and 9(C) show regimes of operation, controlled by microprocessor 810, of both heating zones 510 and 520 of the embodiment 500 of FIG. 5 and corresponding temperature values measured at the peripheral and inner zones of the mirror element heated by the embodiment 500. Although it is not reflected in FIG. 10, it is understood that measurement of temperature at various locations across the mirror element, with the use of thermal sensors such as sensors 812 and 814 is carried out constantly, in real time and in accord with controlling process management by the microprocessor 810.

At the beginning of the heating cycle, at step 1010 that signifies Mode I of the operational cycle, the ignition voltage applied between the terminals 818a and 818b is used to turn on the first heating zone 510 for a period of time 4, as shown by a curve 916 of FIG. 9(A). During this time, the second heating zone 520 is switched "off", as indicated by a curve 914. During the same time, the heating power is transferred from the first zone 510 of the heating element to the corresponding peripheral area of the mirror and the temperature of the peripheral area of the mirror increases from the initial value $T_0$, as shown by a curve 910 of FIG. 9(A), thus defrosting/clearing up of the peripheral area of the mirror. In Mode I, the temperature of the inner area of the mirror remains substantially unchanged and equal to its initial value of $T_0$.

In further reference to FIGS. 5, 8, 9 and 10, at step 1020, the heating cycle enters a "ramp-up" Mode II, during which: i) the second heating zone 520 is switched "on", followed by ii) toggling the zones 510 and 520 "on" and "off" out-of-phase with one another, as indicated by curves 914 and 916, to heat up the peripheral and inner areas of the mirror element to corresponding pre-determined temperatures $T_{s1}$ and $T_{s2}$, as shown in FIG. 9(B). As described above, due to the time-sequenced power management of the embodiment of a multi-zone heater of the invention, separate heating zones are activated independently and in alternation, and at no time more than one heating zone is heating a corresponding area of the mirror element. Specifically, for each zone of the heater, a microprocessor 810 of the controlling circuit 800 of FIG. 8 activates a corresponding transistor from a high-power transistor switch 820 in such a fashion as to have only one of the heating zones switched "on" at any given time. Toggling between or among the heating zones, that is, switching them on in alternation is carried out according to a time-sequence determined by a pre-programmed microprocessor 810 based on the real-time measurements of the temperature of the areas of the mirror-element heated by the heating zones. Such operation allows for time-sequenced power-management in that, within the operational duty cycle of a given heating zone, full electrical power drawn from the source is used to heat up only one area of the mirror (the area corresponding to the heating zone), not the whole mirror element.

During the "ramp-up" Mode II, the instantaneous measured value of the temperature $T_1$ of the peripheral zone of the mirror element should preferably exceed, on average, that ($T_2$) of the inner zone of the mirror element by dT. Time-sequencing of the heating cycles of the zones 510 and 520 in Mode II is pre-programmed so as to assure that all of the viewing surface of the mirror element is cleared up (e.g., defrosted, or defogged) by the moment when the temperatures $T_{s1}$ and $T_{s2}$ are reached. Preferably, the temperature rise speed in any of Modes does not exceed about 18° C. per minute to prevent formation of shear stresses in the glass.

At the moment when the peripheral and inner areas of the mirror element have been heated up to $T_{s1}$ and $T_{s2}$, respectively, at step 1040, the operational cycle of the embodiment enters maintenance Mode III. During this mode of operation, at step 1050, the "on/off" toggling of the heating zones is carried out in a time-sequenced fashion so as to maintain the peripheral and inner areas of the mirror element, on average, at predetermined temperatures $T_{m1}$ and $T_{m2}$ that are correspondingly lower than temperature values $T_{s1}$ and $T_{s2}$. Generally, $T_{m1}$ is at least not lower than $T_{m2}$. It may be preferred to have $T_{m1}$ to be even slightly higher than $T_{m2}$ to assure that the peripheral area of the mirror element (and, preferably, the edge of it as well) acting as a "cold anchor" of the temperature profile across the mirror does not accumulate condensation and freeze, as discussed above. It is understood that heating of the peripheral area of the mirror element up to a temperature that is at least as high as the temperature of the inner area of the mirror element facilitates reduction and elimination of tensile stresses of glass in the peripheral area. Furthermore, such heating facilitates compressive stresses in the peripheral area that prevents microcracks in glass edge from propagating through the glass substrate and increases the life-time of the mirror element.

As an example, in one embodiment of the mirror assembly including the embodiment 500, the operation of which is governed by time-sequenced power management and thermal sensing feedback according to embodiments of the invention, an average heating-power density was measured to be 0.88 W/cm$^2$ in the peripheral area of the mirror corresponding to the zone 510, and 0.38 W/cm$^2$ in the inner zone of the mirror element corresponding to the zone 520 of the heating element. An overall heating-power density was measured to be about 0.53 W/cm$^2$. The exemplary operation cycle of defrosting of such embodiment may be characterized as follows: $T_0$=−20° C., $t_o$~30 seconds, dT~5° C., $T_{S1}$~55° C., $T_{s2}$~52° C., $T_{m1}$~14° C., and $T_{m2}$~10° C. As was discussed above, as a result of such operation the mirror element is defrosted according to manufacturers' specifications. It is understood that, depending on programming of the embodiment of the invention, the heating element may operate so as to provide for substantially equal maximum temperatures, $T_{s1}$=$T_{s2}$, of the peripheral and inner areas. In addition or alternatively, both of these areas may have equal "maintenance" temperatures, $T_{m1}$=$T_{m2}$. Generally, a particular time sequence of power management of the heating zones and pre-determined temperature values for each of the mirror areas are determined so as to eliminate "cold anchors" on the surface of the mirror element and to assure that defrosting/clearing of the peripheral area does not take more time than that of the inner area.

Figure 11:
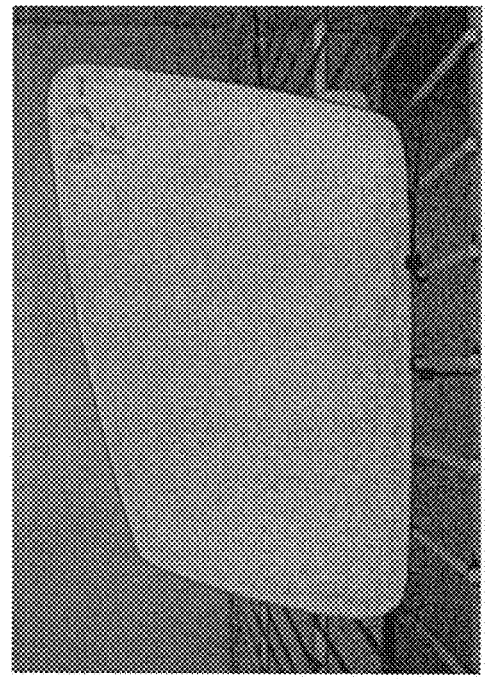
FIG. 11 shows a defrosting of a viewing surface of an automotive mirror element with an embodiment of a mirror-heater of the invention. (A): at 0 sec, when the embodiment is switched on; (B): at 60 sec; (C): at 90 sec; (D): at 150 sec.
Figure 11:
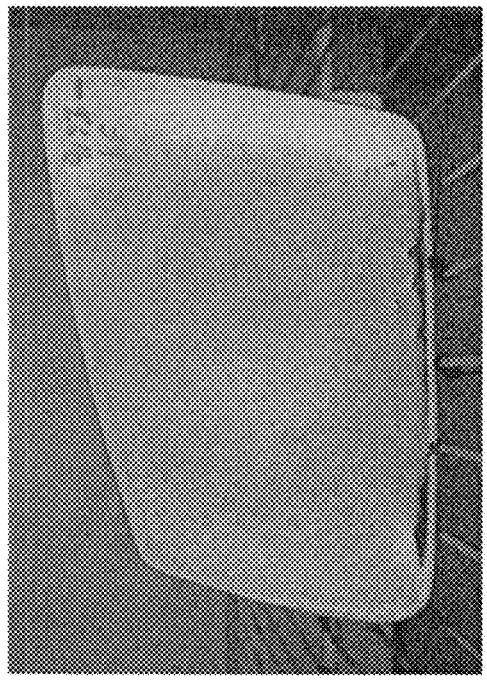
Figure 11:
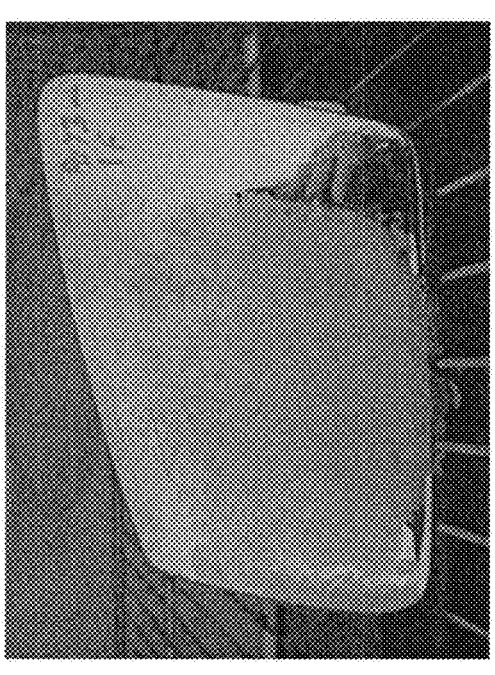
Figure 11:
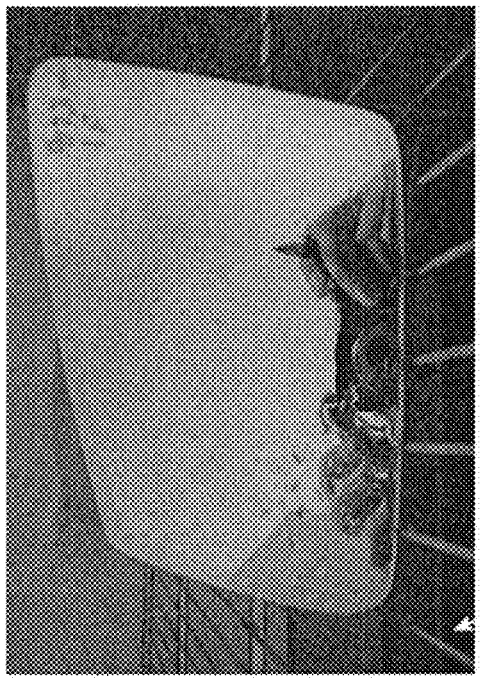
Figure 12A:
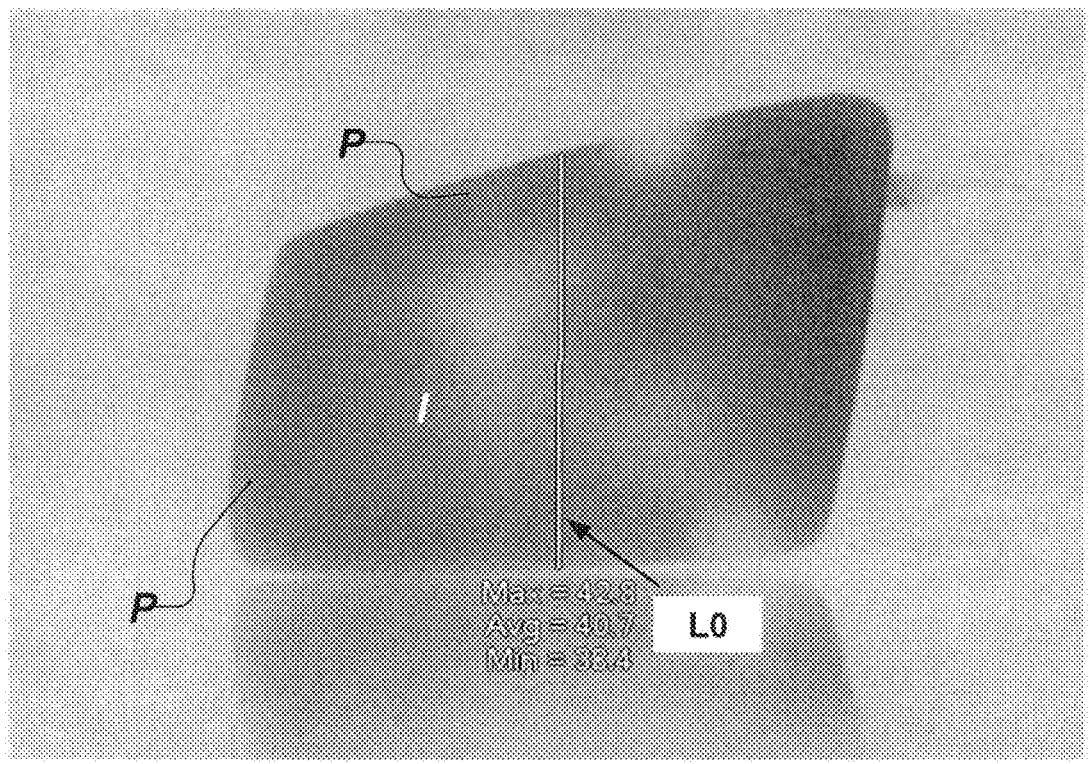
FIG. 12 illustrates operation of an embodiment of a mirror-heater of the invention. (A): an infra-red (IR) image of a mirror heated with the embodiment; (B): a temperature profile, along a line indicated in FIG. 11(A).
Figure 12B:
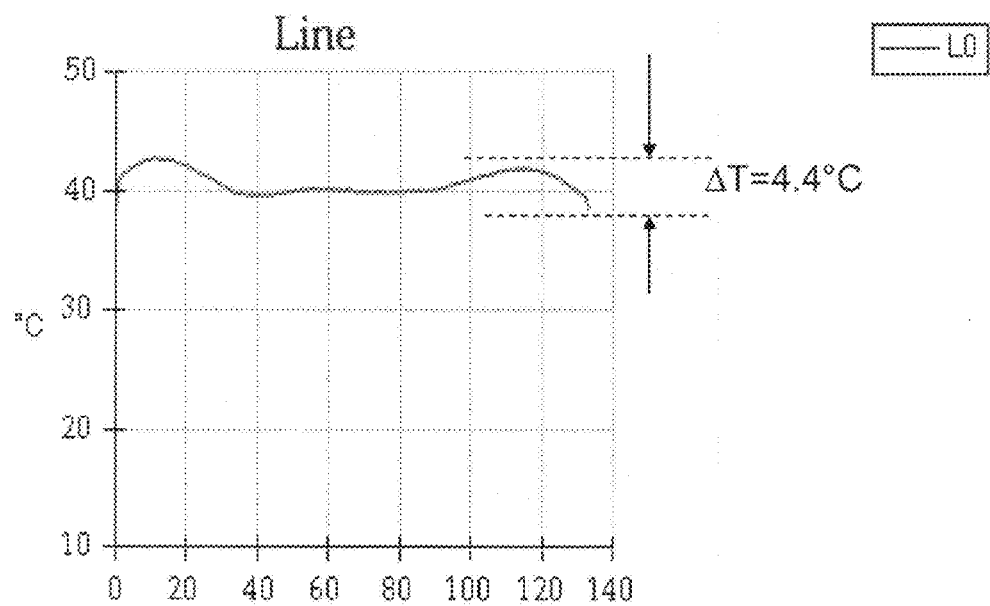

Experimental results of operation of a time-sequenced multi-zone embodiment of the heating element of the invention are depicted in FIGS. 11 and 12. In comparison with FIGS. 2 and 3, FIGS. 11(A-D) demonstrate that the embodiment of the invention expeditiously defrosts and clears-up substantially the entire viewing surface of the mirror within the time-period not exceeding 150 seconds, as required by automobile manufacturers. FIG. 12(A) illustrates an infra-red image of the surface of the mirror element of a rearview assembly that includes an embodiment of the time-sequences multi-zone heater of the invention. It can be seen that the embodiment of the heater performs so as to keep both the peripheral area of the mirror element and the inner area of the mirror element at substantially the same temperature. A temperature distribution across the surface of the mirror element, created by a non-uniform heating profile of a multi-zone heating element of the invention and shown in FIG. 12(B), is substantially devoid of a temperature roll-off at the edges of the mirror element. In particular, both the inner portion I and the edges of the mirror element are shown to be maintained at approximately 40° C. The peripheral area P of the mirror is maintained at a slightly elevated—by about 4.4° C.—temperature as compared to the temperature of the inner area I, as described above in reference to FIGS. 9 and 10.

Embodiments of the invention achieve a goal of heating the peripheral area of the mirror to at least as high a temperature as that of the inner area of the mirror. In doing so, embodiments of the present invention advantageously create such as a temperature distribution profile across the surface of the mirror element that assures substantially uniform defrosting and clearing of all the viewing surface of the mirror element. During the defrosting, embodiments of the invention do not leave "cold anchors" or cold edges the temperature of which differs from the temperature of the inner portion of the surface of the mirror by more than 5° C. Alternatively, as illustrated in FIG. 12(B), embodiments of the present invention assure that i) the peripheral area of the mirror element is at slightly higher temperature than that of the inner area of the mirror, that ii) the distribution of temperature, as measured from the edge of the mirror towards its center across the surface of the mirror after the defrosting time has passed, is characterized by a gradient not exceeding about 5° C. per cm for about a couple of centimeters from the edge for an assembly containing an EC-element and not exceeding about 8° C. per cm for about a couple of centimeters for an assembly containing another reflective element such as a prismatic element, and that iii) the temperature is substantially uniform in the inner portion of the mirror surface. Moreover, embodiments of the invention achieve such defrosting results well within the defrosting time limit of 150 seconds imposed by automobile manufacturers. In addition, embodiments of the invention provide for time-sequenced power management of the heating process so as to tailor and reconfigure the heating of different areas of the mirror element to coordinate the heating cycles with the vehicular engine cycles in order to reduce the electrical power consumption of the heating element. Finally, as will be understood by a skilled artisan, the operation of the embodiments of the invention does not produce tensile stresses in edge portions of the mirror element, which extends the operational life-time of a corresponding rearview assembly.

Although the general principle of operation of embodiments of the invention was described in reference to the specific two-zone embodiment 500 of the heating element and the associated controlling circuit 800, it is understood that the principle of operation and advantages achieved do not change in a general case of a multi-zone heater (such as three-zone heaters of FIGS. 6(A, B)), although appropriate modifications of the controlling circuitry may be required. For example, in a case of a three-zone heater of FIG. 6(A), an embodiment of controlling circuit may comprise three resistors representing resistive traces of corresponding zones of the heater, and a corresponding high-power transistor switch may include three transistors.

Figure 13A:
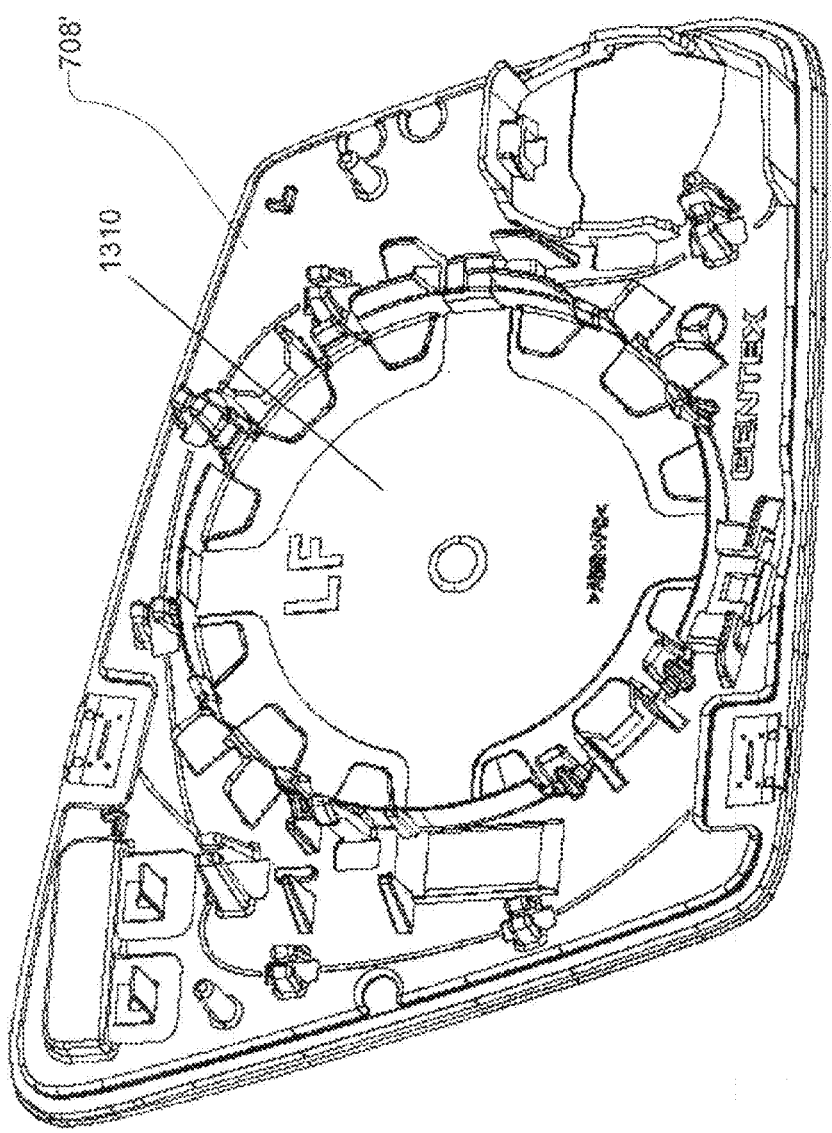
FIG. 13 illustrates an embodiment of an automotive rearview sub-assembly including a PTC or constant-wattage mirror heater of the related art. (A): a perspective view; (B): an exploded view.
Figure 13B:
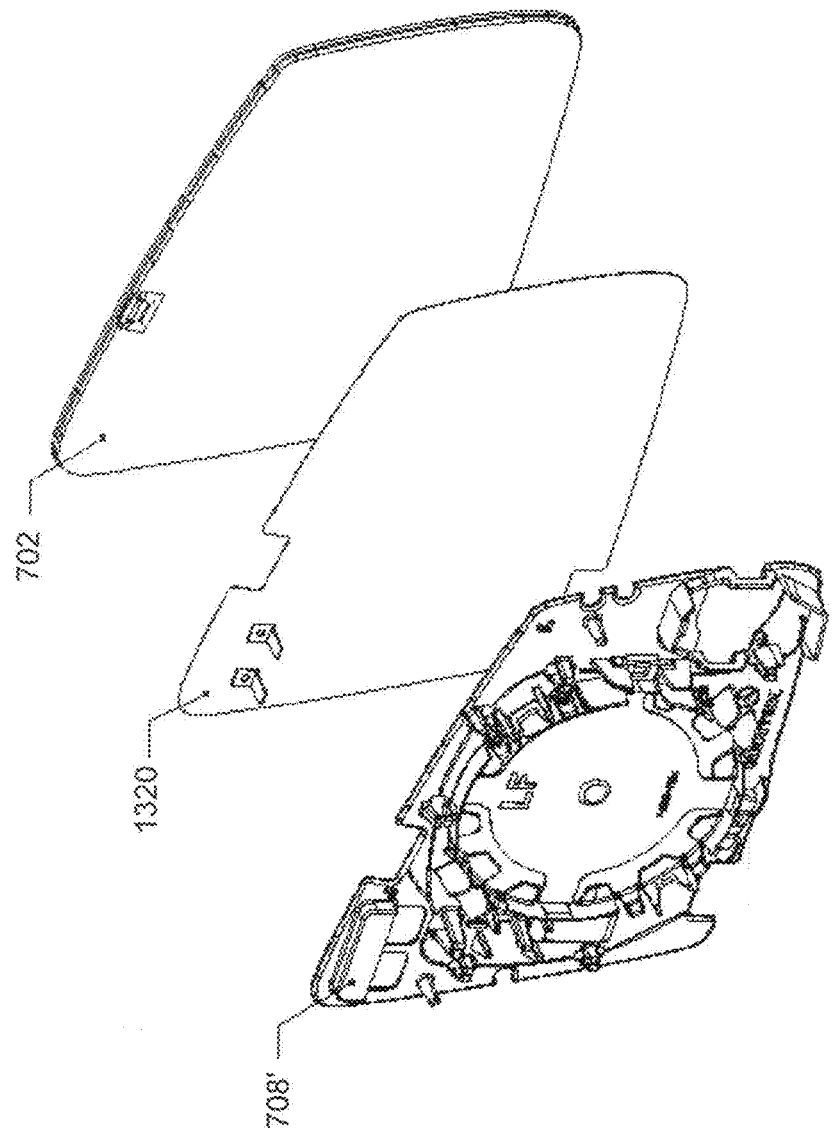

FIGS. 13(A, B) illustrate, for comparison, an embodiment of an automotive rearview assembly, in perspective and exploded views, respectively, that includes a typical resistive heater without the advantageous capabilities of the present invention. In this embodiment, a membrane 1310 covers the central portion of the plastic carrier plate 708' and a flexible heating element 1320 does not include any control circuit, whether embedded or external, because no time-sequenced power management of operation is within the scope of this embodiment.

Although the foregoing discussion was presented with respect to an electro-optic element such as the electro-chromic element, it will be understood that the use of any element—whether an electro-optic or a simple prismatic element—is contemplated in conjunction with embodiments of the present invention. In addition or alternatively, the rearview mirror assembly may include at least one additional device such as, without limitation, an interior illumination assembly, a voice activated system, a trainable transceiver, a microphone, a compass system, a digital sound processing system, a highway toll booth interface, a telemetry system, a moisture sensor, a global positioning system, a vehicle vision system, a wireless communication interface, a camera, a transflective reflector, a navigation system, a turn signal, and an adaptive cruise control system. These systems may be integrated, at least in part, in a common control with information displays and/or may share components with the information displays. In addition, the status of these systems and/or the devices controlled thereby may be displayed on the associated information displays.

While specific values and parameters are recited for various exemplary embodiments, described with reference to drawings herein, it is to be understood that, within the scope of the invention, the values of all of parameters may vary over wide ranges to suit different applications and that various modification are contemplated within the scope of the invention. Furthermore, disclosed aspects, or portions of these aspects, may be combined in ways not listed above. Accordingly, the invention should not be viewed as being limited to the disclosed embodiments.

The embodiment 800 of the controlling circuitry has been described as including a processor 810 controlled by instructions stored in a tangible computer-readable memory. The memory may be random access memory (RAM), read-only memory (ROM), flash memory or any other memory, or combination thereof, suitable for storing control software or other instructions and data. Some of the functions performed by the controlling circuitry 800 have been described with reference to flowcharts and/or block diagrams such as that of FIG. 10. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

It is also appreciated that the processor of the embodiment of the invention may be further configured to determine, based on the real-time temperature measurement feedback provided by the thermal resistors, an instantaneous temperature profile across the surface of the mirror element and, if required, to display such a profile on an information display or, in addition or alternatively, to determine an instantaneous two-dimensional temperature distribution across the surface and present it, as a two-dimensional image, for the viewer on the display. Display of either profile may be carried out in real time or with a delay. Other variations and modification apparent to a person skilled in the art are also contemplated to be within the scope of the invention.

What is claimed is:

1. An exterior automotive rearview assembly for use in association with a vehicle, the assembly comprising:
   a mirror element adapted for use with the exterior automotive rearview mirror assembly and having a perimeter, said mirror element being subject to at least one of formation of ice and condensation of water vapor on a surface thereof during a normal operation of said assembly, said mirror element having an inner area and a peripheral area defining a first band around the perimeter and substantially enclosing the inner area;
   a heating element located behind said mirror element with respect to a viewer, the heating element comprising peripheral and inner heating zones, said peripheral and inner heating zones defined by respectively corresponding electrical trace patterns, said peripheral and inner heating zones respectively corresponding to the peripheral and inner areas of said mirror element, each heating zone being in thermal contact with a corresponding area of the mirror element, said peripheral heating zone arranged in a substantially surrounding relationship with respect to said inner heating zone; and
   a processor electrically connected with the heating element, the processor configured to switch a current flow among the heating zones to cause the heating element to heat the peripheral area to a first temperature and the inner area to a second temperature to effectuate spatially uneven dissipation of heat over a surface of the mirror element by one or more of (i) heating said peripheral area prior to heating said inner area and (ii) heating said inner area to the second temperature that is lower that the first temperature.

2. An assembly according to claim 1, wherein said formation of ice and condensation of water vapor define an anchor region of the peripheral area of the mirror element, said anchor region remaining at a temperature of substantially zero degrees Centigrade at least until a remaining portion of the mirror has been fully defrosted under first defrosting conditions, said first defrosting conditions including (i) spatially even dissipation of heat over the surface of said mirror element or (ii) heating said mirror element starting from a central area and moving outwardly to the peripheral area.

3. An assembly according to claim 1, wherein said peripheral and inner heating zones are spatially non-overlapping.

4. An assembly according to claim 1, wherein the processor is further configured to switch the current flow among the heating zones so as to cause the heating element to change a temperature of the peripheral area while maintaining a temperature of the inner area.

5. An assembly according to claim 1, wherein the heating zones are configured to generate different heat outputs per unit area.

6. An assembly according to claim 1, further comprising a light source behind the heating element with respect to the viewer, said light source configured to provide visually-perceivable indicia representing operation of the vehicle, said heating element containing a light indicia area that is free of said trace pattern and is arranged in overlying registry with said light source such as to transmit light from said light source through said light indicia area towards the viewer.

7. An assembly according to claim 1, wherein the processor is configured to switch the current flow between the first and second heating zones so as to cause the heating element to vary temperatures of the peripheral and inner areas according to a method that comprises measuring, with a plurality of temperature sensors, temperature values across a surface of the mirror element;
increasing a peripheral area temperature to a first value while maintaining an inner area temperature at a second value;
increasing a peripheral area temperature to a first maximum value and an inner area temperature to a second maximum value such as to effectuate uneven dissipation of heat across said mirror element; and
maintaining a peripheral area temperature at a first maintenance value and an inner area temperature at a second maintenance value,
wherein the first and second maintenance values are lower than the first and second maximum values and the first maximum value is at least as high as the second maximum value.

8. An assembly according to claim 1, wherein the mirror element includes at least one of an electrochromic element, a plurality of glass substrates, and a prismatic element.

9. An external automotive rearview mirror assembly for use by a viewer, the assembly comprising:
   an electrochromic (EC) mirror element including contiguous peripheral and inner areas, said peripheral area circumscribing said inner area and disposed around a perimeter of said EC mirror element;
   a heating element located behind the EC mirror element with respect to the viewer, the heating element comprising first, second, and third individually contiguous and non-overlapping heating zones, the first and second heating zones aggregately enclosing the third heating zone located in a substantially central portion of the heating element, the first and second zones being in thermal contact with the peripheral area of the mirror element, the third heating zone being in thermal contact with the inner area of the mirror element; and
   electronic circuitry operably associated with a vehicle that is adapted to host said mirror assembly,
   wherein each of the first, second, and third heating zones has a corresponding pair of terminal contacts through which each of said heating zones is connected to said electronic circuitry, and
   wherein said first, second, and third heating zones are adapted to generate heat alternatively so as to effectuate uneven dissipation of heat over a surface of the mirror element and to heat the peripheral area to a first temperature and the inner area to the second temperature.

10. An assembly according to claim 9, wherein said electronic circuitry further comprises a processor electrically connected to the heating element, the processor configured to switch a flow of current generated by said electronic circuitry through the heating element among the heating zones to cause the heating element to vary temperatures of the peripheral and inner areas in a time-sequenced fashion such as to achieve, in operation of said assembly under freezing conditions, defrosting of about 80 percent of an area of the EC mirror element in no more than about 150 seconds at about 12 or 13 Volts direct current and inrush current of below 4 Amperes.

11. An assembly according to claim 9, wherein the heating zones are, aggregately, substantially co-extensive with the mirror element in a surface of the mirror element to which the heating element is affixed.

12. An assembly according to claim 9, further comprising a light source behind the heating element with respect to the viewer, said light source configured to provide visually-perceivable indicia representing operation of the vehicle, said heating element containing a light indicia area that is substantially optically unobstructed and is arranged in overlying registry with said light source such as to transmit light from said light source through said light indicia area towards the viewer.

13. An assembly according to claim 9, wherein a first heating zones is dimensioned to transfer heat only to the peripheral area and a second heating zone transfers heat only to the inner area.

14. An assembly according to claim 9, wherein said electronic circuitry further comprises
 a processor electrically connected with the heating element and configured to switch a current flow among the heating zones in an alternating fashion to effectuate one or more of (i) heating said peripheral area prior to heating said inner area and (ii) heating said inner area to the second temperature that is lower than the first temperature.

15. An assembly according to claim 9, wherein the heating element further includes temperature sensors configured to measure, in real time, temperature values across a surface of the mirror element, and wherein the processor has a computer readable program code thereon, the computer readable code including program code for determining a time sequence of switching the flow of current among the heating zones on and off based on the input received from the temperature sensors such as to effectuate heating of the mirror element starting from the peripheral area towards the inner area.

16. An assembly according to claim 1, further comprising a reflective polarizer element in optical communication with said mirror element, the reflective polarizer element including an optically anisotropic polarizing birefringent plastic film configured to reflect light of one polarization and transmit light of orthogonal polarization.

17. An assembly according to claim 6, wherein said light source includes an LED and an at least one of an eccentric reflector and an elliptical reflector covering said LED to reflect light generated by said LED through said light indicia area.

* * * * *